United States Patent [19]

Demjanenko et al.

[11] Patent Number: 4,980,844
[45] Date of Patent: Dec. 25, 1990

[54] METHOD AND APPARATUS FOR DIAGNOSING THE STATE OF A MACHINE

[76] Inventors: Victor Demjanenko, 1482 D'Angelo Dr., North Tonawanda, N.Y. 14120; Andres Soom, 125 Wickham Dr., Williamsville, N.Y. 14221; Yong H. Lee, 4285 Chestnut Ridge Rd., Apt. #35A, Tonawanda, N.Y. 14150; Andrei Reinhorn, 12 Troy View La., Williamsville, N.Y. 14221; Tsu-Teh Soong, 249 Wellingwood Dr., East Amherst, N.Y. 14051; David M. Benenson, 53 Andover La., Williamsville, N.Y. 14221; James E. Neil, 354 Parkridge Ave., Buffalo, N.Y. 14215; Harish K. Naidu, 1357 Millersport Hwy., Apt. #4, Williamsville, N.Y. 14221; Selwyn Wright, 959 Van Auken Cir., Palo Alto, Calif. 94303

[21] Appl. No.: 200,116

[22] Filed: May 27, 1988

[51] Int. Cl.$^5$ .................... G08B 21/00; G06F 15/46
[52] U.S. Cl. .................... 364/550; 364/551.02; 364/474.19; 340/680; 73/660
[58] Field of Search .................. 364/550, 551.02, 508, 364/474.17, 474.19; 371/25.1; 340/680; 73/660, 659

[56] References Cited

U.S. PATENT DOCUMENTS

| | | | |
|---|---|---|---|
| Re. 31,750 | 11/1984 | Morrow | 364/508 |
| 4,023,044 | 5/1977 | Miller et al. | 340/680 X |
| 4,184,205 | 1/1980 | Morrow | 364/508 |
| 4,366,544 | 12/1982 | Shima et al. | 364/550 |
| 4,425,798 | 1/1984 | Nagai et al. | 364/508 X |
| 4,510,572 | 4/1985 | Reece et al. | 371/25 X |
| 4,559,600 | 12/1985 | Rao | 364/474.17 |
| 4,607,529 | 8/1986 | Morey | 73/660 |
| 4,614,117 | 9/1986 | Taniguti | 364/508 X |
| 4,642,617 | 2/1987 | Thomas et al. | 340/680 |
| 4,724,524 | 2/1988 | Thomas et al. | 364/508 |
| 4,736,625 | 4/1988 | Patterson et al. | 364/474.17 X |
| 4,758,964 | 7/1988 | Bittner et al. | 364/550 |
| 4,783,998 | 11/1988 | Sander | 364/508 |
| 4,862,385 | 8/1989 | Fujita et al. | 364/550 |

Primary Examiner—Parshotam S. Lall
Assistant Examiner—Joseph L. Dixon
Attorney, Agent, or Firm—Robert P. Simpson; Michael L. Dunn

[57] ABSTRACT

The invention provides a method and apparatus for diagnosing the mechanical condition of a machine. The method of the invention includes the following steps: sensing reference vibrational characteristics of a machine in the time domain; creating a reference signature from the reference vibrational characteristics; saving the reference signature; sensing test vibrational characteristics of the same machine in the time domain; creating a test signature from the test vibrational characteristics; automatically computing a measured distance between at least one point of the reference signature and at least one corresponding point on the test signature; automatically comparing the measured distance against a threshold value to determine if the machine is operating normally or abnormally; and providing a signal when the comparison indicates abnormal operation. An apparatus is also disclosed for implementing the method of the invention.

31 Claims, 11 Drawing Sheets

Microfiche Appendix Included
(1 Microfiche, 94 Pages)

0-8 Cycles 16-24 Cycles

OVERALL

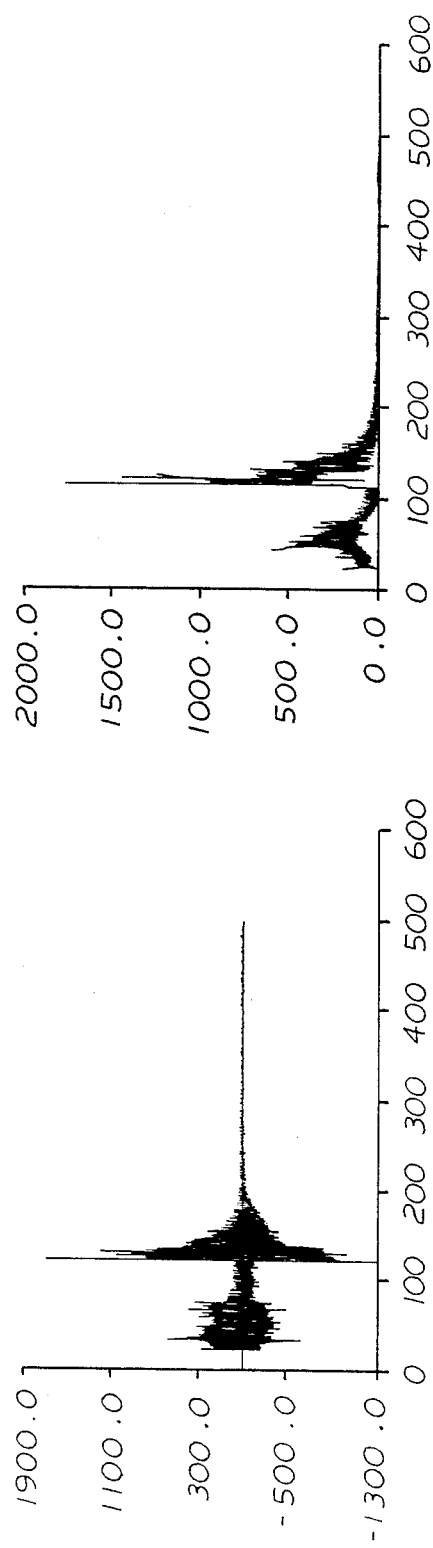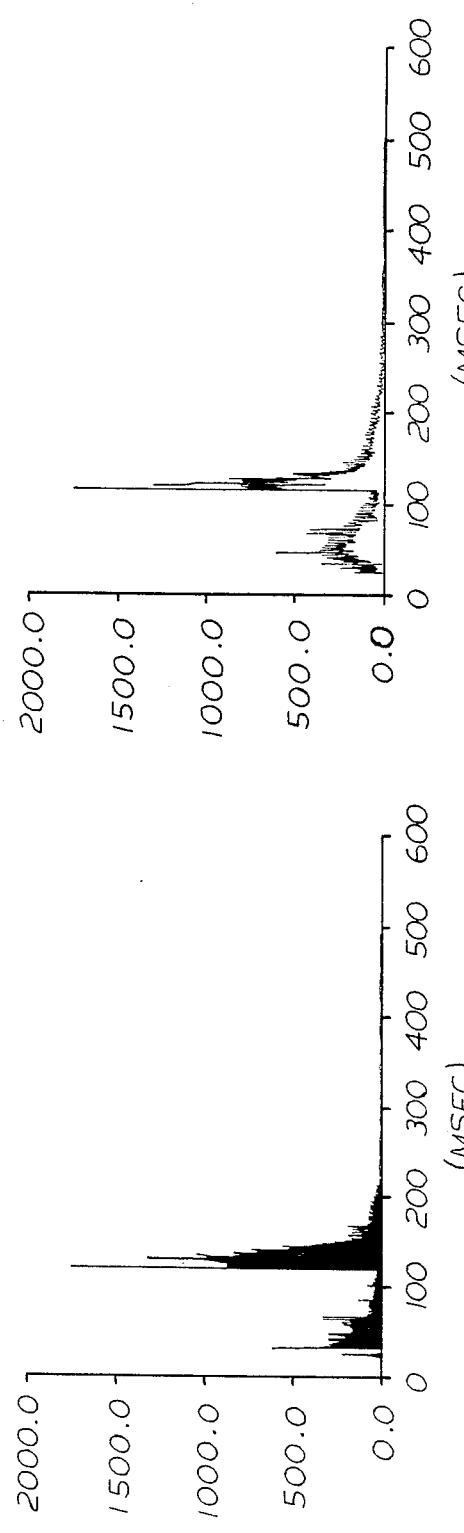

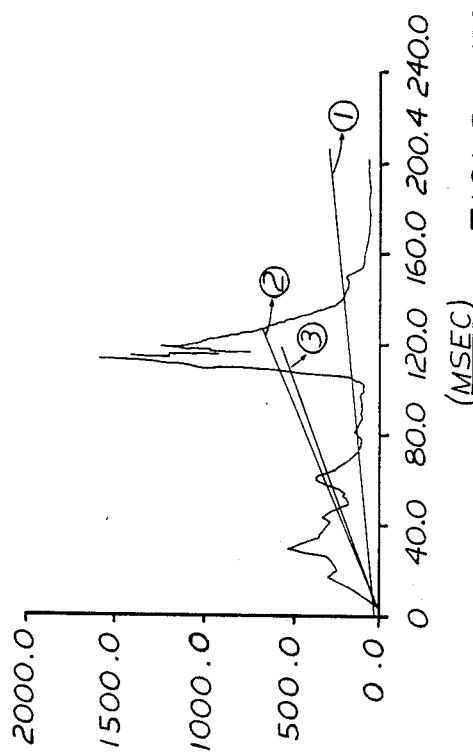
FIGURE 7G.
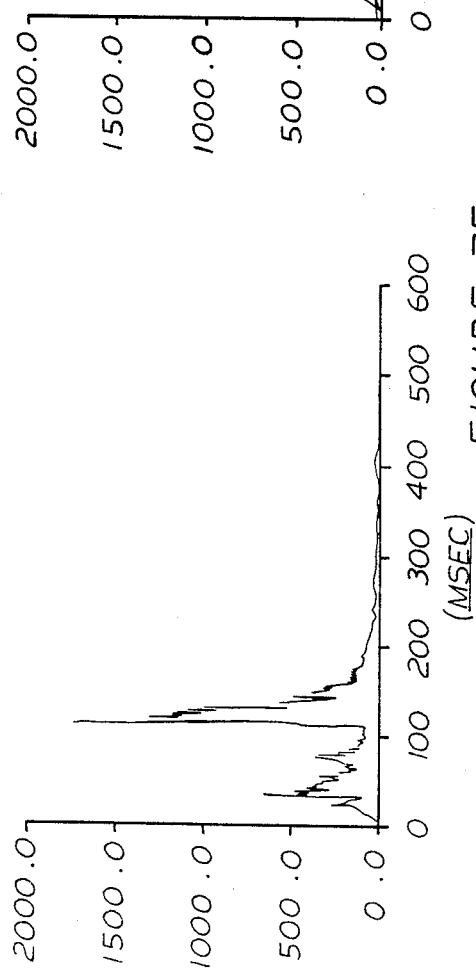
FIGURE 7E.
FIGURE 7F.
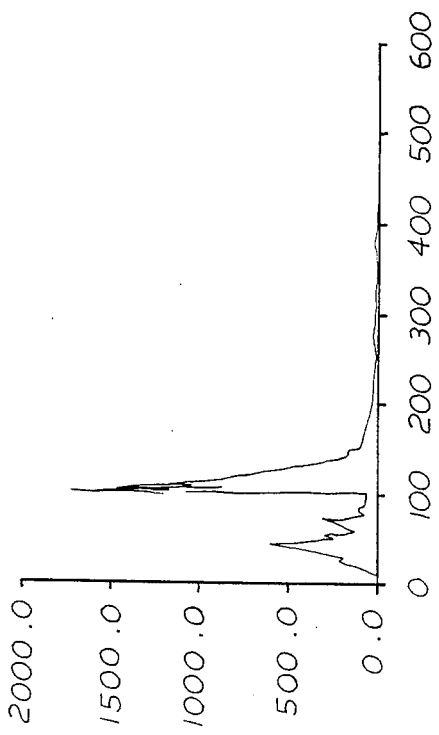
FIGURE 7H.
| Peaks (P) Valleys (V) | Time in Milliseconds |
|---|---|
| V | 3.12 |
| P | 15.96 |
| V | 18.06 |
| P | 24.75 |
| V | 101.68 |
| P | 117.97 |
| V | 151.91 |
PEAKS AND VALLEYS FROM ENVELOPE

|  | NORMAL (CYCLES) | | TAIL SPR. OVERCOMP. (CYCLES) | |
| --- | --- | --- | --- | --- |
|  | MEAN* | STD** | MEAN* | STD** |
| $T_1$ | 0.98 | 0.05 | 0.83 | 0.09 |
| $T_2$ | 19.47 | 0.05 | 18.22 | 0.08 |
| $T_2 - T_1$ | 18.49 | 0.02 | 17.33 | 0.02 |

\* MEAN: IS THE AVERAGE OF A PLURALITY OF EVENT TIMING ANALYSIS RESULTS

\*\* STD: IS THE STANDARD DEVIATION OF A PLURALITY OF EVENT TIMING ANALYSIS RESULTS

FIGURE 9C.

METHOD AND APPARATUS FOR DIAGNOSING THE STATE OF A MACHINE

In accordance with 37 C.F.R. 1.96, a microfiche appendix is to be considered a portion of the entire 'written description' of this invention in conformance with 35 U.S.C. 112. The appendix includes one microfiche having 94 frames.

BACKGROUND OF THE INVENTION

Measurement and analysis of vibration data is a well known method of monitoring the condition of machines. In an ideal machine, no vibration would be produced since all input energy would be used to perform useful work. In practice, however, vibration occurs as a normal by-product of the interaction of mechanical forces within the machine. A good machine design is one which produces low levels of inherent vibration. Subsequent increases in vibration level indicate a change in the dynamic characteristics of the machine, often caused by a defect or deterioration of moving parts.

Perhaps the earliest analyzer of vibration was the power plant attendant who made periodic inspections of plant equipment. This attendant, sometimes called a "runner" because he traveled throughout the entire plant, typically inspected vibration levels by placing his hand upon the machine or by simply listening for sounds produced by abnormal vibrations.

Modern technology has greatly simplified and improved upon vibration monitoring techniques. Sensitive accelerometers have replaced human hands in sensing vibration, and complex electronics have evolved to process the vibration data.

The prior art reveals several methods and apparatus for monitoring vibration. Some devices continuously monitor overall vibration in the time or frequency domain, and provide an indication of an alarm condition when preset vibration levels have been exceeded, (e.g., Shima et al., Judging System For Detecting Failure of Machine, U.S. Pat. No. 4,366,544, Dec. 28, 1982).

Another method of vibration analysis is "Vibration Signature Analysis", which is most often accomplished in the frequency domain. Under this method, time-domain vibration data are converted to the frequency domain using a Fourier Transform. The unique frequency spectrum obtained is often termed the "signature" of the machine. A signature of a machine under test may be analyzed and compared to a signature for a normal machine. Differences in the two spectra may indicate an abnormal condition. Prior art devices capable of providing a frequency spectra are known. One such device includes a handheld probe for collecting vibration data, and the capability of executing a Fast Fourier Transform to provide a frequency spectrum, (e.g., Microlog IMS, available from Palomar Technology International, Carlsbad, Calif.). Morrow also discloses a data acquisition system which performs an automatic frequency spectrum analysis whenever a probable or actual malfunction is detected (Morrow, Data Acquisition System, U.S. Pat. No. 4,184,205, Jan. 15, 1980).

A common problem associated with most of the prior art monitoring equipment is that they usually require a human operator to analyze and compare the signatures. Prior art inventions lack the sophisticated electronic circuitry and data processing necessary for automatic comparison of the spectra and for rendering a decision regarding the condition of the machine under test, with only minimal human interface. Prior art inventions are also generally incapable of analyzing machines under transient conditions, and thus find applications restricted to steady state operation. Still other prior art devices are incapable of extracting events, or specific sections of interest in a typical vibration signal. Also, many prior art devices are large and bulky, or require interfacing with a mainframe computer. Finally, most prior art devices require the sensing element (e.g., accelerometer) to be located proximate the machine element to be analyzed. For example, bearings on electric motors are typically monitored by placing sensing devices on the bearing housings themselves.

SUMMARY OF THE INVENTION

The invention provides a method and apparatus for diagnosing the mechanical condition of a machine. The method of the invention includes the following steps: sensing reference vibrational characteristics of a machine in the time domain; creating a reference signature from the reference vibrational characteristics; saving the reference signature; sensing test vibrational characteristics of the same machine in the time domain; creating a test signature from the test vibrational characteristics; automatically comparing maximum, minimum, and intermediate amplitudes in pre-selected segments of the reference and test signatures; automatically determining from the comparison of the differences between the reference and test signatures whether the machine is functioning normally or abnormally; and providing a signal when the comparison indicates abnormal operation. The apparatus aspect of the invention provides means for accomplishing each step of the above described method. Such selected means, for accomplishing such steps are described in detail in the following description. The disclosure of such means herein will enable one skilled in the art to envision other suitable means for accomplishing such steps. Other alternate means will become apparent to one skilled in the art from the means described herein.

An overall object of the invention is to provide a novel method and apparatus for diagnosing the mechanical condition of a machine.

A more particular object of the invention is to provide a method and apparatus for diagnosing the mechanical condition of a machine by automatically creating, saving, and comparing reference and test signatures with no need for human intervention in the comparison or decision-making process.

Still another object of the invention is to provide a method and apparatus which is capable of diagnosing the mechanical condition of a machine utilizing sensors which are located remote from the machine element being monitored.

Yet another object of the invention is to provide a method and apparatus for diagnosing the mechanical condition of a machine which is capable of analyzing vibration signals in either the time domain or frequency domain.

Yet still another object of the invention is to provide a method and apparatus for extracting events within a vibration signal.

A further object of the invention is to provide a portable apparatus for the purpose of diagnosing the mechanical condition of a machine.

Still a further object of the invention is to provide a method and apparatus capable of non-intrusive testing and diagnosis of the mechanical condition of a machine.

These and further features, objects and advantages of the invention will become apparent to those skilled in the art from the following detailed description and appended drawings.

BRIEF DESCRIPTION OF THE DRAWINGS

FIG. 7A represents a time-domain acceleration signal obtained from a circuit breaker.

FIG. 7B represents the rectified time-domain acceleration signal of FIG. 7A.

FIG. 7C represents the resultant signal after the signal of FIG. 7B has been processed by the first localized maximum determination pass.

FIG. 7D represents the resultant signal after the resultant signal of FIG. 7C has been processed by the second localized maximum determination pass.

FIG. 7E represents the resultant signal after the resultant signal of FIG. 7D has been processed by the third localized maximum determination pass.

FIG. 7F represents the resultant signal after the resultant signal of FIG. 7E has been processed by the fourth and final localized maximum determination pass.

FIG. 7G illustrates the least-square error linear fit method of the invention by showing the resultant signal of FIG. 7F but with an expanded time abscissa.

FIG. 7H is a Table of peaks and valleys obtained for the least-square error linear fit method as applied to the envelope shown in FIG. 7G.

FIG. 9C is a Table which shows the timing information that was extracted from the peaks of the envelopes shown in FIGS. 9A and 9B.

DETAILED DESCRIPTION OF THE INVENTION

Figure 1A:
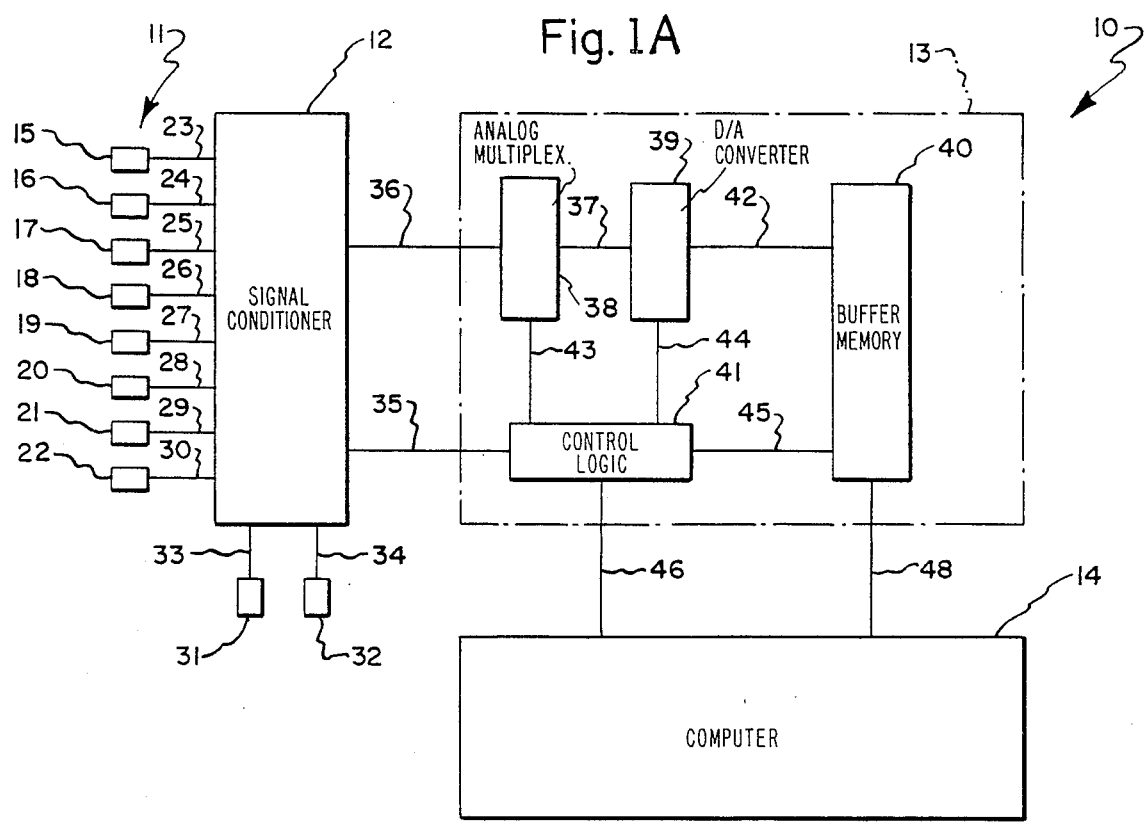
FIG. 1A shows a block diagram of the apparatus aspect of the invention.

At the outset, it should be clearly understood that the drawings are to be read together with the specification, and are to be considered a portion of the entire "written description" of this invention, as required by 35 U.S.C. 112. Also, like reference numerals on different drawing figures refer to identical elements of the invention. The following definitions apply throughout the written description which follows:

"Vibrational characteristics"—refers to vibrational energy produced by a machine; also referred to in the written description as vibrational data, vibrational signals, acceleration signals, or acoustical signals; this energy is sensed and processed by the invention.

"Portable"—capable of being handheld and carried from place to place.

"Reference"—indicates a defect-free condition of a machine.

"Normal"—indicates a machine is operating free from defects.

"Abnormal"—indicates a machine is operating with defects or maladjustments.

"Test"—indicates condition or state of a machine is unknown. A machine under "test condition" is one being analyzed or diagnosed to determine whether it is operating normally or abnormally (defect-free or with defects).

"Signature"—is a time-domain or frequency-domain signal obtained by sensing and processing vibrational characteristics of a machine.

"Reference signature"—is a signature of a machine under reference (defect-free) operating conditions.

"Test signature"—is a signature of a machine under test operating conditions.

"Localized maximum"—is a maximum amplitude within a particular region of a signal.

"Envelope"—is an outline of an amplitude-modulated wave, and may also be defined as the curve passing through the extremes of a waveform.

"Significant local maximum"—is a maximum amplitude within a particular region of an envelope.

"Significant local minimum"—is a minimum amplitude within a particular region of an envelope.

"Peak"—is a significant local maximum of a waveform.

"Valley"—is a significant local minimum of a waveform.

"Event"—is a region of time of a vibration signal during which significant, (i.e., significantly more than background noise), vibrational energy is present.

"Window"—is a region of a time-domain signal. In the present invention, windows may be automatically selected so as to include one or more events.

"Segment"—is a region of a reference or test signature, and may be either in the time domain or the frequency domain.

"Maximum, minimum, and intermediate amplitude"—refers to a maximum, minimum, and intermediate amplitudes within segments of the test and reference signature.

"Resolution ratio"—is a measure of the decision-making reliability.

"Remote"—refers to a significant distance from the machine element being diagnosed.

THE APPARATUS

FIG. 1A shows a block diagram of the apparatus aspect of the invention. Hardware system 10, which implements the method of the invention, comprises vibrational sensor bank 11, signal conditioner system 12, data acquisition system 13, and computer 14. At the outset, it should be understood that lines 35, 36, 37, 42, 43, 44, 45, 46 and 48 are single-line schematic representations of a plurality of lines. Vibrational sensor bank 11 comprises accelerometers 15–22 which are secured to the machine being monitored. The accelerometers may be any device capable of sensing vibrational energy, such as Kistler Model Nos. 8642A or 8624. Moreover, although sensor bank 11 is depicted here as comprising accelerometers, it is understood that any device capable of sensing vibrational energy will suffice. For example, sensitive microphones which detect acoustic energy can also be used successfully.

Acceleration signals from accelerometers 15–22 are transmitted to signal conditioner system 12 via coaxial cables 23–30. Signal conditioner system 12 bandlimits the sensor signals to approximately 0–10 KHz to prevent aliasing of the sampled signal. Signal conditioner system 12 also includes an adjustable gain amplifier and supplies the bias current for the sensors. Signal conditioner system 12 may be any circuit capable of bandlimiting the sensor signals to prevent aliasing and also capable of powering the transducers and providing adjustable gain to the transducer signals. System 12 preferably interfaces via an expansion circuit board which plugs into an IBM-PC ® compatible computer. This feature enhances the overall portability of the invention. In a preferred embodiment, signal conditioner system 12 comprises Programmable Filter, model PF-1, and Vibration Power Supply and Amplifier, model VPA-1, available from Tree Data Products Corporation, North Tonawanda, N.Y.

Figure 1B:
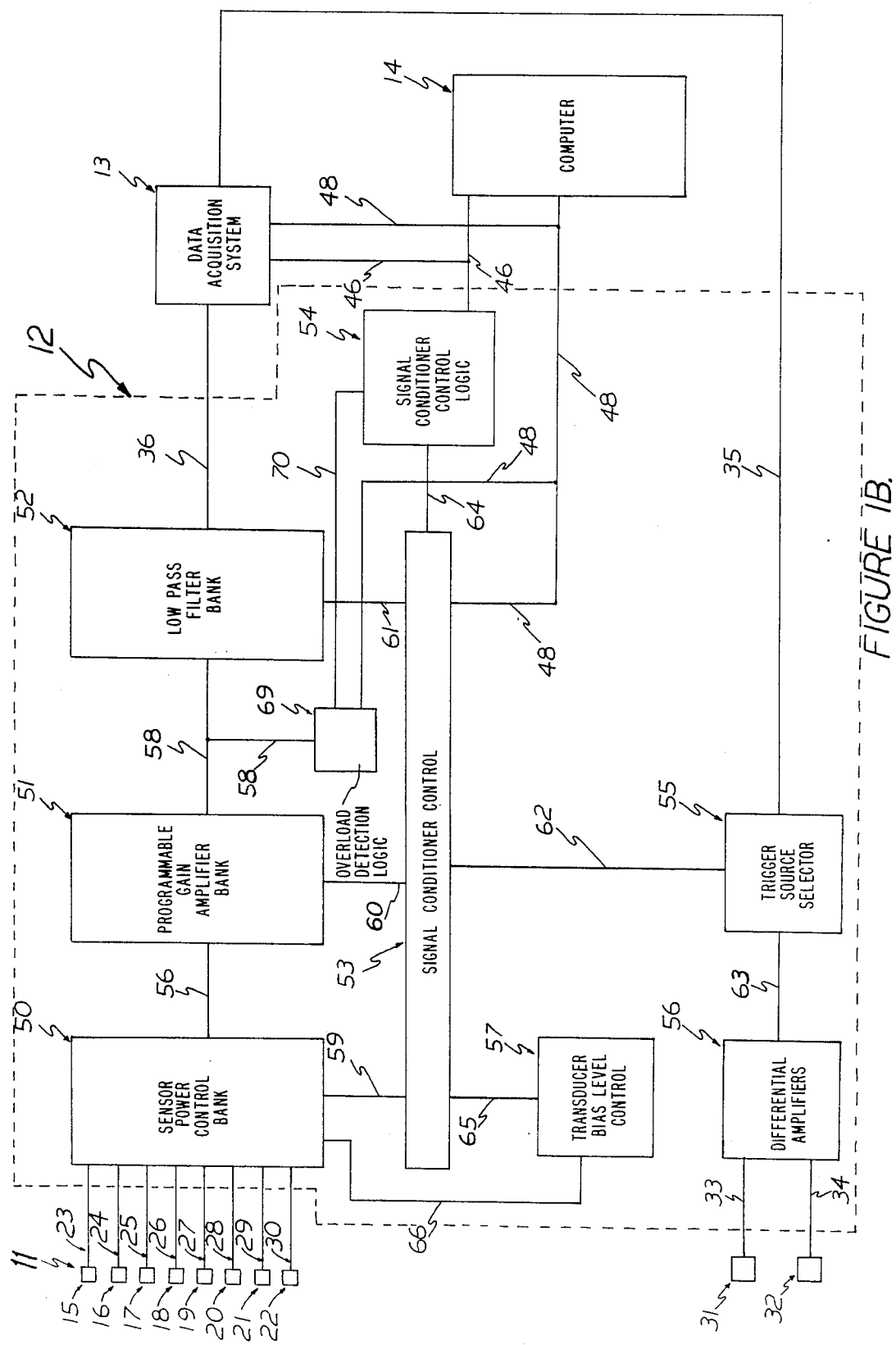
FIG. 1B shows a block diagram of the signal conditioner system of the apparatus aspect of the invention

Referring now to FIG. 1B, signal conditioner system 12 is shown to include sensor power control bank 50, programmable gain amplifier bank 51, low pass filter bank 52, signal conditioner control 53, signal conditioner control logic 54, transducer bias level control 57, trigger source selector 55, overload detection logic 69, and differential amplifiers 56. At the outset, it should be understood that lines 56, 58, 59, 60, 61, 62, 63, 64, 65, 66, and 70 are single-line schematic representations of a plurality of lines.

Sensor power control bank 50 provides proper bias current to each transducer 15–22 via lines 23–30, as determined by signal conditioner control 53 and communicated via line 59. Control 53 selectively enables or disables the bias current for each transducer independently so that transducers which do not need the bias current can be used as vibration signal sources. For example, an external microphone which senses acoustical vibrational energy would not necessarily require a bias current. Transducer bias level control 57 selectively adjusts the bias current level, via line 66, provided to transducers 15–22, to accommodate a wide variety of transducers from various manufacturers. Signal conditioner control 53 communicates the bias level to be used via line 65 to transducer bias level control 57.

Acceleration signals from sensor bank 50 are communicated via line 56 to programmable gain amplifier bank 51. Amplifier bank 51 provides variable amplification of the acceleration signals, independently selectable for each signal, as controlled by signal conditioner control 53 via line 60. In a preferred embodiment, control 53 selects one of eight possible gain settings depending upon the expected amplitude of the acceleration signal being processed.

Amplified signals from amplifier bank 51 are communicated via line 58 to overload detection logic 69. Overload detection logic 69 determines if a signal has an amplitude that is too high (absolute value is too high) such that data acquisition system 13 would not be able to properly digitize the signal. In a preferred embodiment, the signal range must be limited to 10 volts in order to accurately represent the data in digital form. An indication of overload is saved for each signal individually and is communicated to computer 14 via data line 48 under the control of signal conditioner control logic 54 via line 70.

Amplified signals from amplifier bank 51 are also communicated via line 58 to low pass filter bank 52. Filter bank 52 bandlimits the acceleration signals to approximately 0–10 KHz to prevent aliasing of the sampled signals. In a preferred embodiment, filter bank 52 may be designed to provide a plurality of bandpass filter frequencies. In an embodiment shown in FIG. 1B, filter bank 52 provides two bandpass frequencies. For example, for a sampling rate of 32 KHz, a bandpass frequency of 10 KHz is provided, whereas for a sampling rate of 16 KHz, a bandpass frequency of 5 KHz is provided. The appropriate bandpass frequency is selected independently for each signal by signal conditioner control 53 and communicated to filter bank 52 via line 61. The amplified and filtered acceleration signals are communicated to data acquisition system 13 via line 36.

As shown in FIGS. 1A and 1B, inputs 31 and 32 are used to synchronize data acquisition system 13 to external events. For example, input 31 may sense the "trip"

of a circuit breaker and input 32 may sense the "close" of a circuit breaker. This data is communicated to signal conditioner system 12 via data lines 33 and 34, respectively, and is processed by system 12 and then used to trigger the data acquisition system 13 via line 35.

Referring to FIG. 1B, synchronizing event signals are received at inputs 31 and 32 via lines 33 and 34, respectively. Differential amplifier 56 receives the synchronizing event signals and adjusts (amplifies) and references (isolates) the signals to internal system voltage levels. The adjusted and referenced synchronization signals are communicated to trigger source selector 55 via line 63. Trigger source selector 55 selects the appropriate synchronizing signal for initiating the data acquisition in response to a control signal from signal conditioner control 53 communicated via line 62. The trigger information is communicated to data acquisition system 13 via line 35.

Signal conditioner control logic 54 communicates with computer 14 via control line 46 and provides appropriate operation signals for signal conditioner control 53 via line 64 and to overload detection logic 69 via line 70. Computer 14 communicates with signal conditioner control 53 via data line 48 to store the desired control settings for the signal conditioning system. Signal conditioner control 53 controls the operation of sensor power control bank 50, programmable gain amplifier bank 51, low pass filter bank 52, transducer bias level control 57, and trigger source selector 55 via lines 59, 60, 61, 65, and 62, respectively. Overload detection logic 69 communicates with computer 14 via data line 48 to indicate which signals (if any) have amplitudes which cannot be properly digitized (because the amplitudes are too large) by data acquisition system 13.

Referring to FIG. 1A, data acquisition system 13 comprises analog multiplexer 38, analog to digital converter 39, buffer memory 40, and data acquisition control logic 41. Analog vibration signals which have been filtered and amplified by system 12 are transmitted via multiple data lines to analog multiplexer 38. After multiplexing, the signals are transmitted to analog to digital converter 39 via data line 37. The digitized data is then transmitted to buffer memory 40 via data line 42 for later processing by computer 14. Data acquisition control logic 41 controls the timing of the data processing of multiplexer 38, analog to digital converter 39, and buffer memory 40, via control lines 43, 44, and 45, respectively. Data acquisition control logic 41 also communicates with computer 14 via control line 46 and receives trigger information from signal conditioner system 12 via line 35. Digitized data is communicated from buffer memory 40 to computer 14 via data line 48.

In practice, data acquisition system 13 may be any circuit capable of multiplexing analog input signals, converting these signals to digital data and storing the data in memory for later processing. Once again, it is preferable that system 13 be arranged on a circuit board which fits into a standard IBM-PC expansion slot. In a preferred embodiment, it was found that Model ISC-16 Computer Scope, available from R & C Electronics, functions satisfactorily for this purpose. Model ISC-16 permits sampling of up to sixteen channels at a 1 MHz aggregate throughput. The data is deposited in a 128 kilobyte memory buffer which stores 65,536 samples total or 8192 samples per channel with 8 total channels. At a sampling rate of 32 KHz, this permits acquiring approximately 0.25 seconds, or 15 cycles, of vibrational data per operation of a momentarily operating machine. This is more than adequate for diagnosing momentarily operating machines such as circuit breakers, and continuously operating machines such as motors and turbines.

Similarly, computer 14 may be any computer, but preferably a portable or personal computer which is IBM-PC compatible. In a preferred embodiment, a Compaq ® III portable computer was found to operate satisfactorily. Computer 14 processes all of the digitized vibration data, including performing the Fast Fourier Transforms necessary to create the power spectra, selecting appropriate time-domain windows and frequency-domain segments, comparing the reference and test signatures, and implementing the decision-making aspect of the method of the invention. A listing of the source program (in C language and also in 8088 assembly language) is included in this specification just prior to the claims and constitutes part of the written description of the invention in accordance with 35 U.S.C. 112. Computer 14 also provides an indication on its display as to the mechanical condition of the machine being monitored.

THE METHOD

At the outset, it should be understood that the method described herebelow is a preferred embodiment of the method of the invention. As such, several steps are described as "optional". Optional steps are those steps which are not absolutely necessary to implement the method of the invention, i.e., the method achieves the stated objects of the invention even without these steps. Hence, optional steps are not critical limitations of the claimed invention. The method of the invention comprises several steps as follows:

1. Sense and monitor one or more sets of time-domain vibrational characteristics of machine in reference (defect-free) condition.

2. Select quantity, size, and location of windows in time-domain vibrational data. (Optional step)

3. Process time-domain vibrational data obtained in Step 1 by a linear or non-linear transformation to create one or more sets of reference signatures. If windows were selected under Step 2, process time-domain vibrational data using window configuration selected in Step 2.

4. Isolate preselected segments of the reference signature. (Optional step)

5. Store representations of one or more sets of reference signatures from Step 3 in memory.

6. Sense and monitor one or more sets of time-domain vibrational characteristics of machine under test condition.

7. Process time-domain vibrational data obtained in Step 6 by a linear or non-linear transformation to create one or more sets of test signatures. If windows were selected under Step 2, process time-domain vibrational data using same window configuration selected in Step 2.

8. Compute one or more average sets of reference and test signatures from sets of reference signatures previously stored in Step 5 and sets of test signatures computed in Step 7. (Optional step)

9. Compare test and reference signatures. If averaging was performed in Step 8, compare test and reference signature averages. If segments were selected in Step 4, process comparison on data corresponding to the selected segments.

10. Render decision based upon comparison in Step 9 as to mechanical condition of machine, (normal, abnormal, etc.).

11. Indicate decision (condition of machine).

Step 1—Sense and Monitor One or More Sets of Time Domain Vibrational Characteristics of Machine in Reference (Defect-Free) Condition.

The first step in diagnosing a machine is to sense and monitor the vibrational characteristics of a machine known to be operating defect-free. One or more sensing transducers are used simultaneously to acquire vibrational data during operation of the machine. This normal operating condition is defined as the reference condition. For momentarily operating machines, the vibration should obviously be monitored while the machine is in operation. Circuit breakers, for example, should be monitored during open (trip) and close operations. It may be necessary, due to slight variations in machine vibration characteristics, to collect multiple sets of vibration data, followed by an averaging process, as described in Step 8, to obtain an average machine reference signature. In the decision-making process of a preferred embodiment, it is necessary to have multiple sets of data, as discussed infra.

Continuously operating machines may yield pertinent vibration data both during transient (start-up or braking) or steady-state operation. Induction motors, for example, produce very high torque at start-up and certain mechanical elements may be subject to failure during this time. Some motor elements, however, may demonstrate abnormal vibration under steady-state load conditions. The method of the invention is capable of diagnosing machine elements under all operating conditions.

Figure 2A:
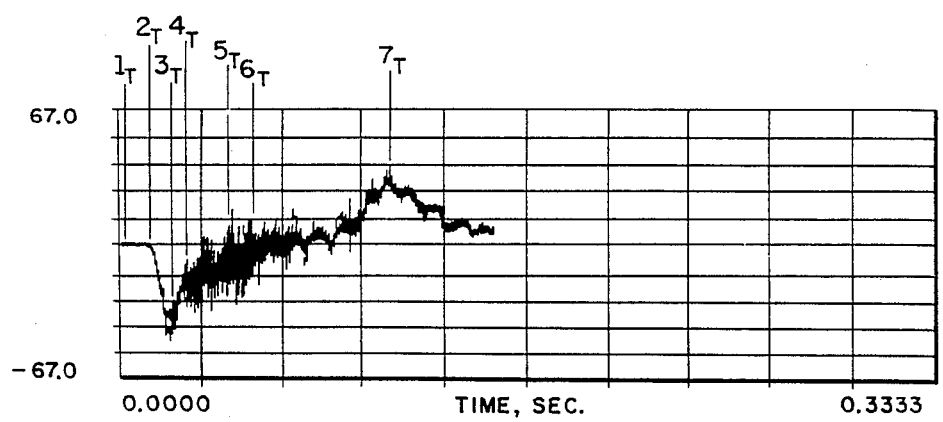
FIG. 2A is a plot of an actual vibration acceleration signal obtained from a circuit breaker during a trip operation.
Figure 2B:
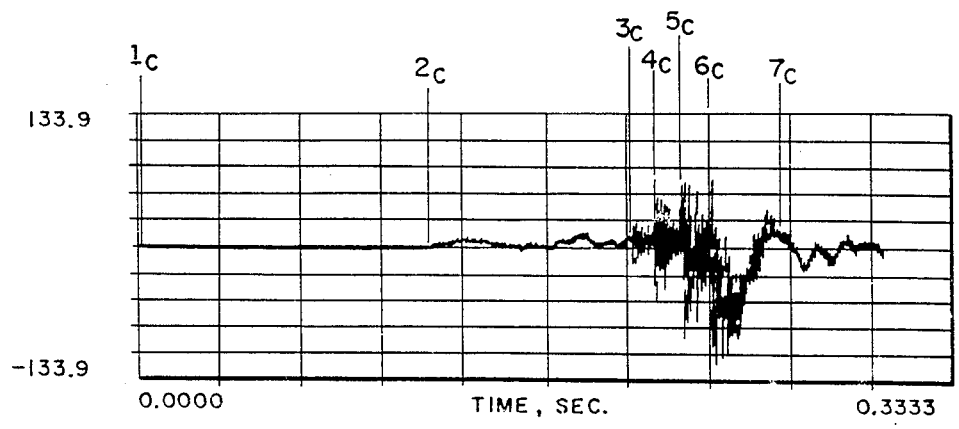
FIG. 2B is a plot of an actual vibration acceleration signal obtained from a circuit breaker during a close operation.
Figure 3A:
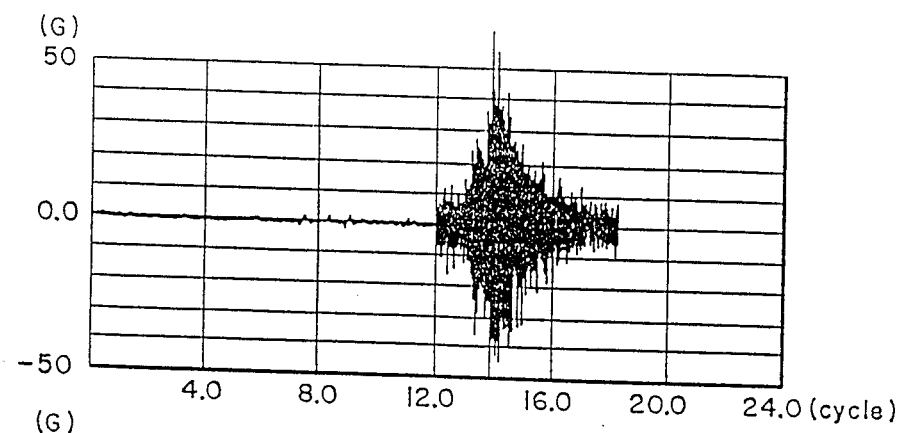
FIG. 3A is a plot of an acceleration signal from a circuit breaker obtained during a close operation when no defects are present.
Figure 3B:
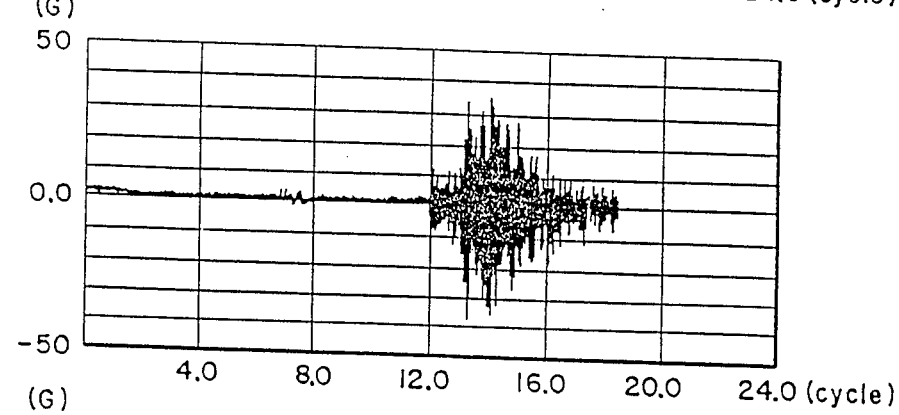
FIG. 3B is a plot of an acceleration signal from the same defect-free circuit breaker described in FIG. 3A, but obtained at a different time.
Figure 3C:
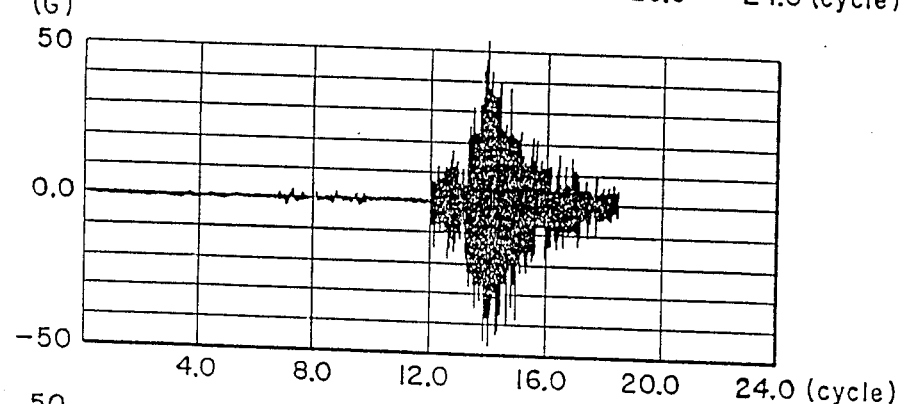
FIG. 3C is a plot of an acceleration signal from the same circuit breaker described in FIG. 3A, but with a defective pull rod.
Figure 3D:
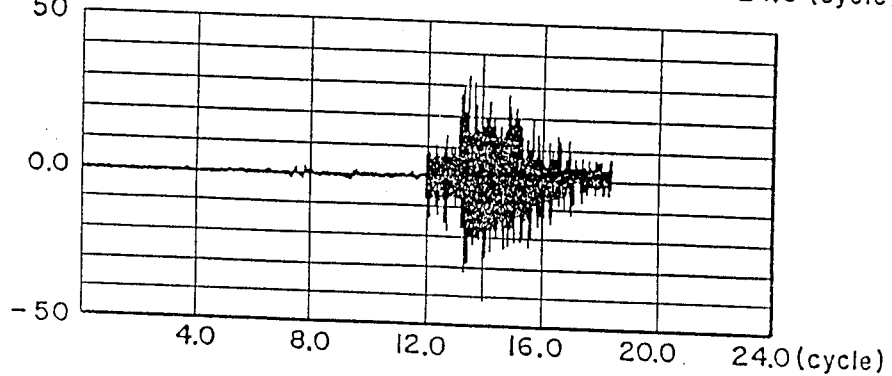
FIG. 3D is a plot of an acceleration signal from the same circuit breaker described in FIG. 3A, but with modified stationary contacts.

FIGS. 2A and 2B illustrate the first step of the method sensing and monitoring time-domain vibrational characteristics of a machine in a reference (defect-free) condition. FIG. 2A is an actual vibration acceleration signal obtained from a circuit breaker during a trip operation. The signal was obtained using the present invention by securing accelerometers to the wall of a circuit breaker and monitoring the vibration over time. The ordinate of the plot is in units of G (where G is the acceleration of a freely falling body due to gravity, approximately equal to 32 ft./sec.$^2$ or 9.8 m./sec.$^2$ near the earth's surface), and the abscissa is in units of seconds. Reference numerals $1_T$ through $7_T$ on the plot refer to discrete events which occur as a circuit breaker opens as follows:

$1_T$ Trip signal received by circuit breaker
$2_T$ Motion of mechanical elements of breaker begins
$3_T$ Kick-off spring separates
$4_T$ Main contacts separate
$5_T$ Accelerating spring separates
$6_T$ Main moving contacts separate from resistors
$7_T$ Low frequency bouncing Similarly, FIG. 2B represents an acceleration signal obtained from a circuit breaker during a close operation. Reference numerals $1_C$–$7_C$ on the plot refer to discrete events which occur as a circuit breaker closes as follows:

$1_C$ Close signal received by circuit breaker
$2_C$ Motion of mechanical elements of breaker begins
$3_C$ Isolating contacts touch
$4_C$ Main moving contacts touch resistors
$5_C$ Accelerating spring contact
$6_C$ Main contacts touch and kick-off spring touches
$7_C$ Low frequency bouncing FIGS. 3A–3D illustrate the difficulties in diagnosing the condition of machines by analyzing vibration data in the time domain. FIGS. 3A and 3B represent acceleration signals of a defect-free circuit breaker, and FIGS. 3C and 3D represent acceleration signals of the same circuit breaker operating with defects or abnormalities. The ordinate in the figures is in units of G, while the abscissa is in units of cycles, where 1 cycle=16.67 milliseconds.

FIG. 3A is a signal obtained from a circuit breaker having no defects obtained during a close operation. The signal in FIG. 3A is said to be a first defect-free time signal. FIG. 3B is a signal obtained from the same circuit breaker having no defects, but obtained at a different time. The signal in FIG. 3B is said to be a second defect-free time signal. It can be seen from FIGS. 3A and 3B that even the vibration signature of a defect-free machine can vary over time.

FIG. 3C is a signal obtained from the same circuit breaker but with a defective pull rod, and FIG. 3D is a signal obtained from the same circuit breaker but with modified stationary contacts. Both of these defects are significant and can lead to complete machine failure if not diagnosed and corrected.

Comparison of the signals from the defective breaker in FIGS. 3C and 3D with the first and/or second defect-free signals of FIGS. 3A and 3B illustrates the difficulty a human operator encounters in attempting to detect a defect. While the operator may be capable of detecting differences in the overall amplitude of the envelope of the waveform shown in FIGS. 3D and 3A, or 3C and 3B, it is virtually impossible to detect the subtle differences between the signals of FIGS. 3A and 3C, or 3B and 3D. Moreover, the operator is further confounded by the differences in the two normal signals. Even if the operator could solve the dilemma caused by having two different defect-free signals, and even in cases where he can detect the differences between the first and second defect-free signals, it is much more accurate and cost effective to perform this analysis electronically.

Step 2—Select Quantity, Size, and Location of Windows in Time Domain Vibrational Data (Optional Step).

In a preferred embodiment, the second step in the method is to select the quantity, size, and location of windows in the time domain. This step of the method includes a processing mechanism to isolate short regions, or windows, of the time-domain acceleration signal. These windows contain information which is useful in the later comparison step of the method. Once the windows have been selected, the data within each window are processed.

Figure 4A:
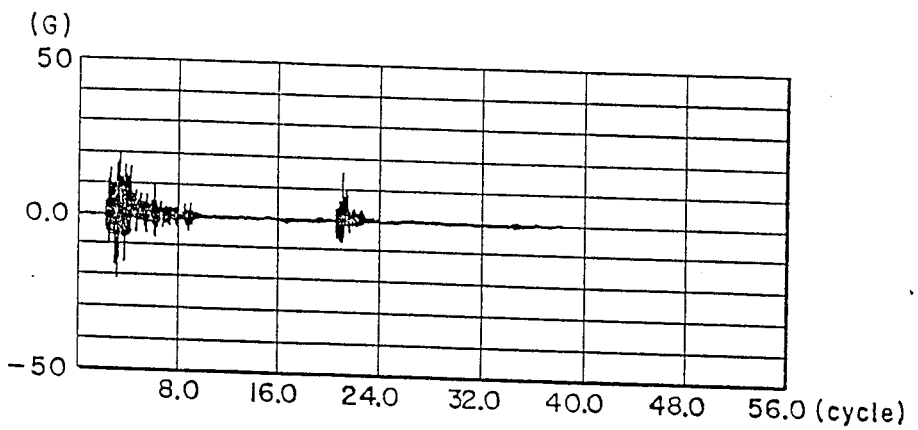
FIG. 4A shows a time-domain acceleration signal obtained from a circuit breaker during an open operation.

The present invention utilizes either of two methods to establish the placement of windows. Windows may be set manually based upon test data of previously tested similar machines. For example, FIG. 4A shows the acceleration signal of a particular machine. The excitation is strong between 0–8 cycles and between 20–24 cycles, whereas little activity appears between 8–20 cycles. Also, the amplitude varies with time within the excited regions. This observed information suggests that windows located at 0–8 cycles and 20–24 cycles would be appropriate for machines of similar type.

Alternatively, automatic window placement may be achieved by algorithms which detect the location of peaks and valleys of the envelope obtained from the acceleration signal. Referring to FIGS. 7A–7G, the automatic window placement method comprises the following steps:

Step 2.1—Signal Processing

The first step is to analyze the original acceleration signal to determine envelopes containing meaningful information. In a preferred embodiment, this is achieved by rectifying the original time-domain acceleration signal and determining localized maxima of the signal. FIG. 7A represents an original time-domain acceleration signal. FIG. 7B represents the rectified time-domain acceleration signal of FIG. 7A, where rectification is achieved by obtaining the absolute value of the original signal. The rectified time-domain signal of FIG. 7B comprises a set of discrete data points. For example, the signal may comprise 8192 data points. The localized maxima of the rectified signal is obtained by sequentially analyzing all of the data points in groups of three, determining the maximum value of the three points, saving the maximum value and its corresponding time coordinate. This process is repeated a number of times to reduce the number of data points which define the envelope while retaining the essential characteristics of the envelope and enabling application of a least-square error linear fit for the detection of peaks and valleys. For purposes of this description, a peak is defined as a significant local maximum of a waveform, whereas a valley is defined as a significant local minimum of a waveform.

In a preferred embodiment, this localized maxima determination process is repeated four times. FIG. 7C represents the resultant signal after the first localized maximum determination pass; FIG. 7D represents the resultant signal after the second localized maximum determination pass; FIG. 7E represents the resultant signal after the third localized maximum determination pass; and FIG. 7F represents the resultant signal after the fourth and final localized maximum determination pass.

Step 2.2—Peak and Valley Extraction

A number of techniques may be utilized to determine the peaks and valleys of the envelope. For example, least-square error quadratic fits or other well-known curve-fitting techniques may be used. In a preferred embodiment, a least-square error linear fit method is employed. The manner in which peaks are detected using this method is illustrated by FIG. 7G. FIG. 7G represents the signal of FIG. 7F which results from the final localized maximum determination pass, but with an expanded time abscissa. The set of points comprising the envelope is gradually reduced by eliminating a point on the envelope from one end. Before removal of each point, a well known least-square error linear fit routine is applied and the slope of the resultant line is determined. The slope of the line corresponding to each set of points is saved. The resultant set of slopes is analyzed. A peak is defined as a point about which the slope changes from increasing to decreasing, whereas a valley is defined as a point about which the slope changes from decreasing to increasing. The manner in which peaks are detected using this method is illustrated by FIG. 7G, which shows the envelope obtained after the final local maximum determination pass. Analysis of the lines labeled 1, 2, and 3 reveals the following:

Line 1: number of time-domain points=154 corresponding time instant=204 ms (approx.) slope of linear fit=1.8 units Line 2: number of time-domain points=134 corresponding time instant=125 ms (approx.) slope of linear fit=5.8 units Line 3: number of time-domain points=132 corresponding time instant=114 ms (approx.) slope of linear fit=5.38 units Thus, the slope of line 3 has decreased, indicating the presence of a peak. The peak detected by this method occurs at approximately 122 ms. This peak is clearly shown in FIG. 7G. Valleys are detected in a similar manner. FIG. 7H illustrates a table of peaks and valleys obtained for the least-square error linear fit method as applied to the envelope shown in FIG. 7G.

Step 2.3—Event Extraction

The event extraction process employs a rule-based algorithm to eliminate unnecessary and insignificant peaks and valleys from among those determined in Step 2.2. An event is defined as a region of time during which significant vibrational energy is present. Events are determined by analysis of the peaks and valleys of the envelope corresponding to the acceleration signal. An intermediate step in extracting events is the removal of insignificant peaks and valleys. In a preferred embodiment, two rules are utilized to remove unwanted peaks and valleys:

Rule 1—If peaks and valleys are within 2 msec. of each other, both the peak and the valley are discarded.

Rule 2—If a peak is less than 10% in magnitude from the highest peak, the smaller peak is regarded as insignificant and is discarded.

Two further rules are utilized to extract events from the remaining peaks and valleys:

Rule 3—For each peak, the event is defined to begin and/or end at the valley adjacent to a peak if the valley is of amplitude greater than 10% of the peak.

Rule 4—If the valley is of amplitude less than 10% of the peak the event is defined to begin and/or end at the nearest point adjacent to a peak where the envelope has a magnitude equal to or less than 10% of the peak amplitude.

Figure 8:
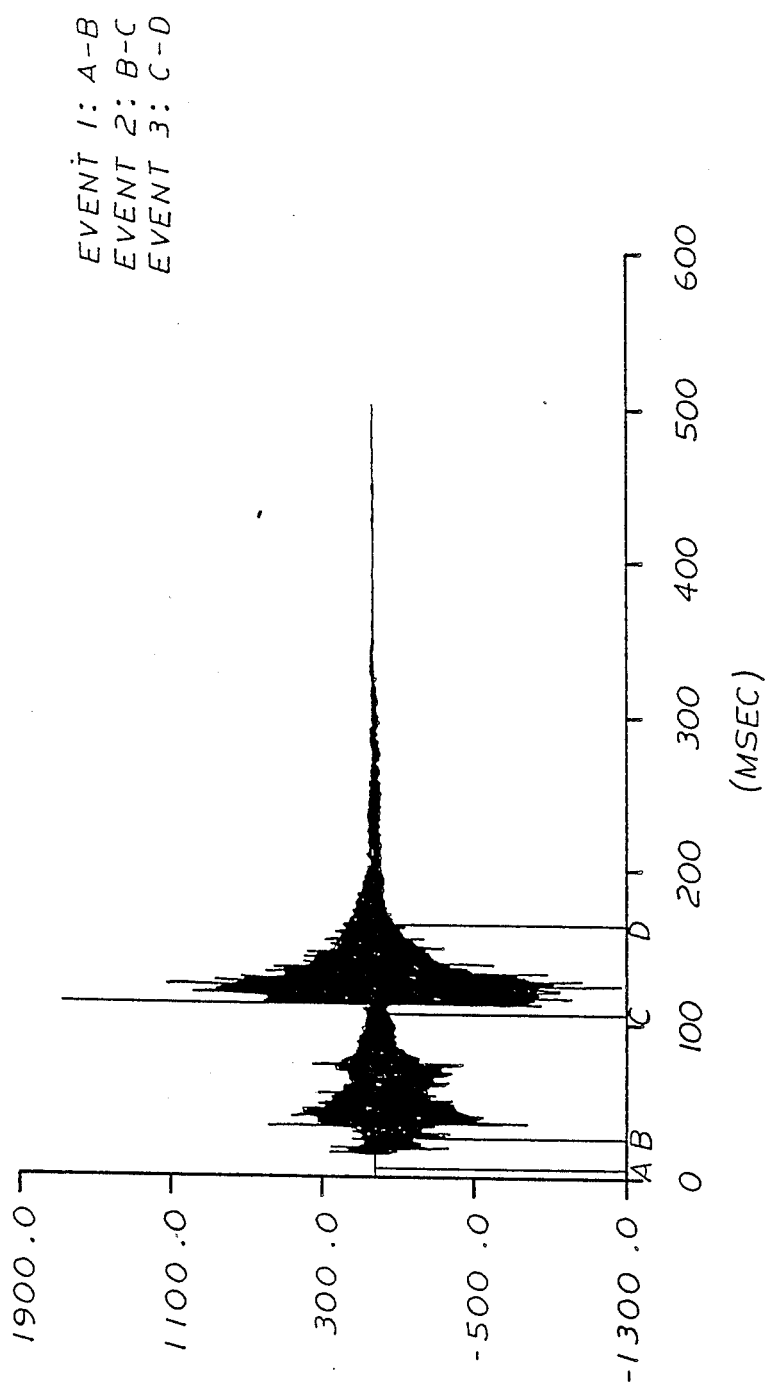
FIG. 8 shows the events located by the event extraction process for the acceleration signal of FIG. 7A.

FIG. 8 illustrates the events located by the event extraction process for the acceleration signal of FIG. 7A. The events are identified as occurring during time segments of the original signal described as follows:

Event #1: From 3.12 ms to 18.06 ms with the peak occurring at 15.96 ms (bounded by points A and B on FIG. 8).

Event #2: From 18.06 ms to 101.68 ms with the peak occurring at 24.75 ms (bounded by points B and C on FIG. 8).

Event #3: From 101.68 ms to 151 ms with the peak occurring at 117.97 ms (bounded by points C and D on FIG. 8).

This time-domain window placement determination can be performed on one or more channels of data with the resultant events found on each analyzed for consistency so that the time-domain windows can be placed at similar positions on multiple channels. The final time-domain window placement is stored for later use in Steps 3 and 7.

Step 3—Process Time Domain Vibrational Data Obtained in Step 1 by a Linear or Non-linear Transformation to Create One or More Sets of Reference Signatures. If Windows Were Selected Under Step 2, Process Time Domain Vibrational Data Using Window Configuration Selected in Step 2.

The next step in the method is to process the time-domain vibrational data obtained in Step 1 by a linear or a non-linear transformation to create one or more sets of reference signatures. The transformation can be a linear transformation, such as a non-recursive transformation, (e.g., low-pass filter) or may be a non-linear transformation, such as a power spectrum transformation.

In a preferred embodiment, the time-domain acceleration signal is transformed into a frequency-domain spectrum. This conversion into the frequency domain is not absolutely necessary; the comparison process of the invention (Step 9) is capable of comparing both signals in the time domain and spectra in the frequency domain, with or without windowing. In a preferred embodiment, however, a short-time spectral processing technique is utilized to transform the time-domain signal into a frequency-domain spectrum. In short-time spectral analysis, a window is literally positioned over the sequence of data of the acceleration signal and, at each window position, the spectrum of the data inside the window is estimated.

In a preferred embodiment, a short-time power spectrum is used, which essentially comprises a series of smaller short-time spectra averaged together in a magnitude sense. The implementation of this computation uses the commercially available FTFPS routine from IMSL, (International Mathematical and Scientific Library) Inc., Houston, Tex., and a similar implementation uses the commercially available 87FFT routine from MicroWay Inc., Kingston, Mass. There exist other power spectrum estimation techniques, some of which are based on the autocorrelation function, which would yield similar results. The transformation of the autocorrelation function applied to the time-domain windowed data into the frequency domain is not necessary since the comparison process of the invention (Step 9) is capable of comparing both signals in the time domain and spectra in the frequency domain.

FIGS. 4A-4D illustrate application of short-time processing to a typical vibration signal.

Figure 4B:
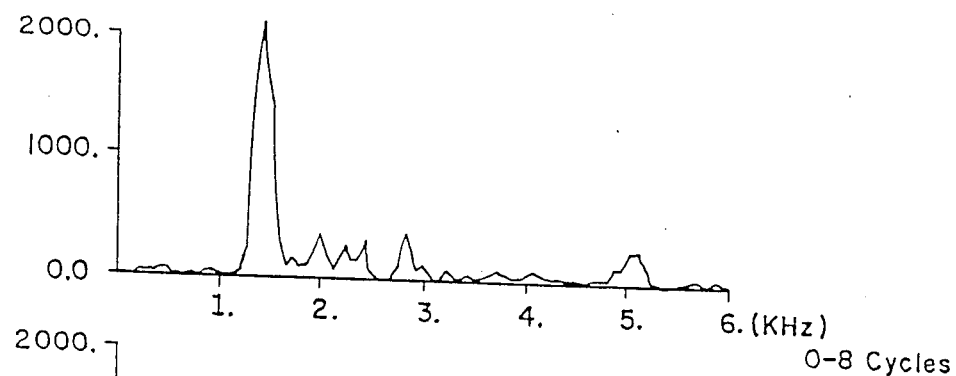
FIG. 4B shows the short-time power spectrum associated with a 0-8 cycle window of the signal shown in FIG. 4A.
Figure 4C:
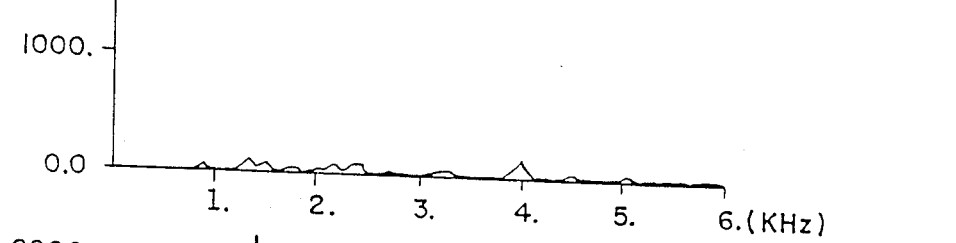
FIG. 4C shows the short-time power spectrum associated with a 16-24 cycle window of the signal shown in FIG. 4A.
Figure 4D:
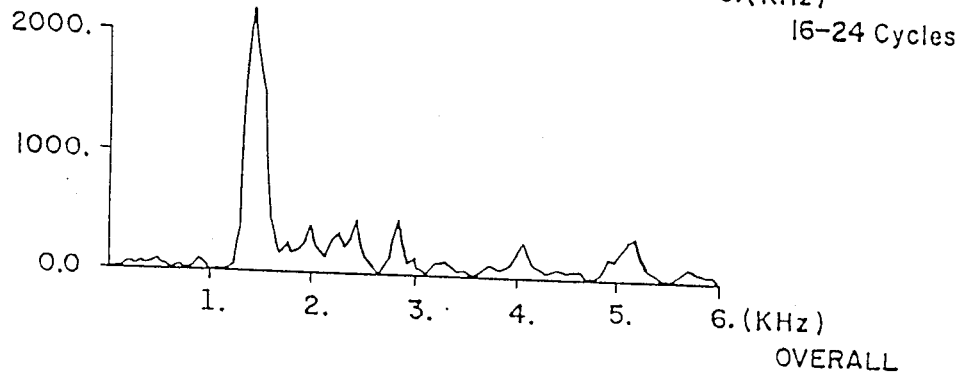
FIG. 4D shows the overall power spectrum of the signal shown in FIG. 4A.

FIG. 4A shows an actual acceleration signal of a circuit breaker during an open operation. FIG. 4D shows the overall power spectrum of the signal of FIG. 4A. FIG. 4B shows the short-time power spectrum associated with a 0-8 cycle window of the signal in FIG. 4A, while FIG. 4C shows the short-time power spectrum associated with a 16-24 cycle window. It is shown that the overall power spectrum is very similar to the short-time power spectrum associated with the 0-8 cycle window, while it is considerably different from the short-time power spectrum associated with the 16-24 cycle window. This indicates that the power spectrum of a windowed segment of a signal can substantially determine the overall power spectrum. Therefore, spectral properties of some other portions of the signal (e.g., 16-24 cycle window of FIG. 4A) may be difficult, if not impossible, to ascertain by analysis of the overall power spectrum. It is obvious that the short-time power spectral analysis is capable of extracting more information than conventional power spectral analysis (without windowing). Certain events or defects which appear during certain times might otherwise go unnoticed or undetected if not for the windowing technique of short-time signal processing. This is not to say that windowing is a critical aspect of the invention. Indeed, even without windowing, the present invention detects and diagnoses defects which were previously undetectable by prior art devices. However, some defects may be incapable of detection without windowing.

In short-time spectral analysis, the size and position of the window should be chosen carefully. Windows which are too small may result in unreliable spectral estimation, and windows which are too large may produce spectra close to the overall spectrum. In a preferred embodiment, window sizes of two to four cycles are appropriate for a 16 KHz sampling rate. This is not to say that other window sizes will not work, only that these sizes have rendered satisfactory results. Once the sizes of the windows have been selected, the windows must be positioned, either manually or automatically as discussed in Step 2, supra, so that most of the events occur within them. For example, again referring to FIG. 4A, the two windows of size 8 cycles include most of the non-zero values of the signal and thus contain most of the events. In FIG. 4A, two windows were selected. In practice, the number of windows utilized varies depending upon the characteristics of the acceleration signal.

Figure 9A:
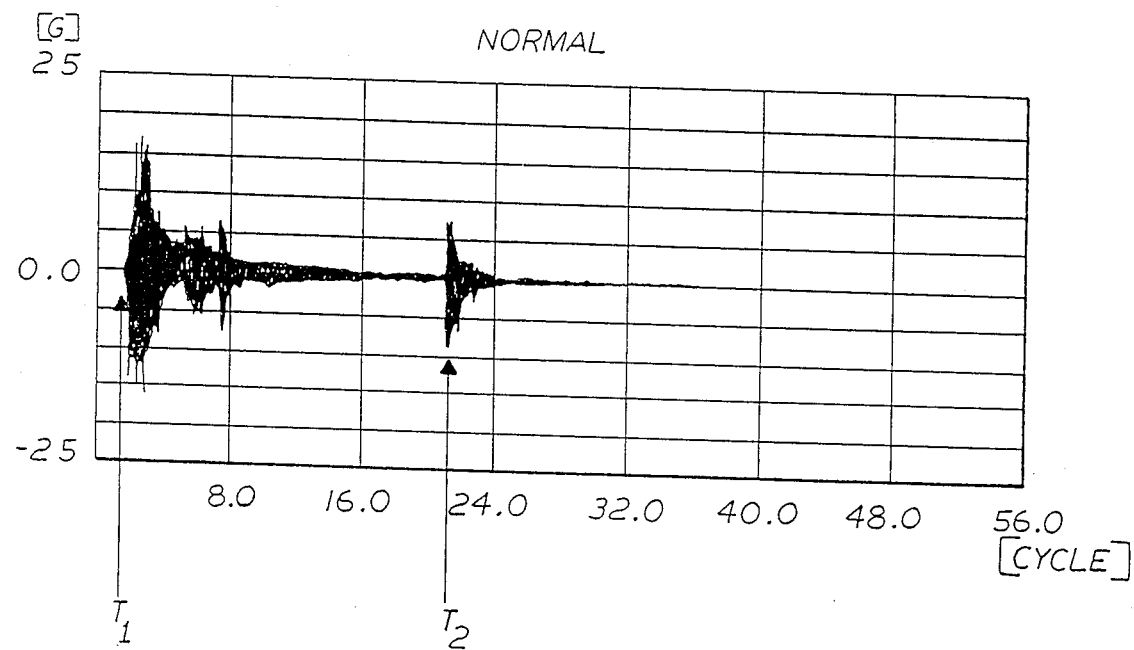
FIG. 9A shows an acceleration signal for a normal (defect-free) circuit breaker obtained during an open (trip) operation.
Figure 9B:
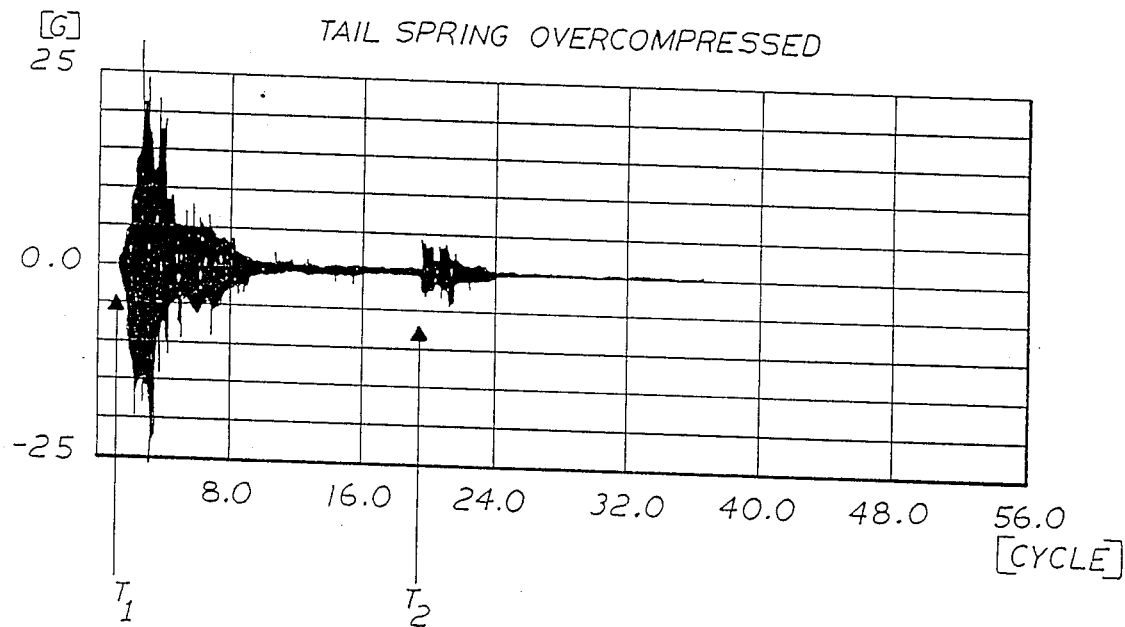
FIG. 9B shows a time-shifted acceleration signal obtained from the circuit breaker of FIG. 9A during an abnormal open (trip) operation, where the abnormality is caused by over-compression of the circuit breaker's tail spring.

Other processing techniques, both in the time domain and frequency domain, both linear and non-linear, may also be used, such as log spectra, energy spectra, and zero crossing rate, autocorrelation, inter alia. Additionally, event timing analysis exclusively in the time domain which may further operate on the peaks and/or valleys as determined previously by Step 2.2, or any similar method, can provide additional information as to the condition of the machine. For example, FIG. 9A shows the data for a normal circuit breaker open (trip) operation and FIG. 9B shows the data for an abnormal circuit breaker open (trip) operation where the abnormality is the over-compressing of the breaker's tail spring. This causes a time shift in the envelope corresponding to a faster movement in its opening operation as shown in FIGS. 9A and 9B. FIG. 9C shows in a Table the timing information that was extracted from the peaks of the envelopes. These times could be further used to measure differences as, for example, between the first event and the second event, etc.

In addition to the processing described above, techniques can be used to pre-process the data, such as inverse-filtering. The purpose of inverse filtering is to simulate a signal that would be expected at a point closer to the true vibration source. Such a true vibration source is often relatively inaccessible. To establish the inverse filter, the signals of the desired inaccessible point and an easily accessible external point are measured during the operation of the machine and a transfer function between the inaccessible point and the externally accessible point is computed from the signals obtained. From this transfer function, the inverse transfer function between the externally accessible point and the inaccessible point is computed. This inverse transfer function is then saved. Under test conditions, this inverse transfer function is then used with the externally accessible point to recreate the signal that would have been observed at the inaccessible point if the sensor was placed at the inaccessible point. The advantage of inverse-filtering is that it permits simulation of the true vibration source which may be very difficult to access under normal test conditions.

Step 4—Isolate Preselected Segments of the Reference Signature (Optional Step).

The fourth step in the method is to isolate preselected segments of the reference signature. A segment is defined to be a region of a reference or a test signature, and may be either in the time domain or the frequency domain. These segments are preselected based upon previous test data which indicates that the segments contain information which will be useful in the later comparison step of the method. Segments are illustrated in Tables A–D, infra at Step 10, which show segments in the frequency domain of 0–2 KHz, 2–5 KHz, 5–10 KHz, and 0–10 KHz. The segment positions are stored for later use in Steps 8 and 9, rather than creating a number of copies of portions of the reference signature.

Step 5.—Store Representations of One or More Sets of Reference Signatures From Step 3 in Memory.

The fifth step in the method is to store the reference signature for later use. In a preferred embodiment, the reference signature is stored on a magnetic disk drive (either on a floppy disk or a hard disk) as a conventional file managed by the operating system of the computer. Also in a preferred embodiment, the reference signature is stored in its entirety with its corresponding segmentation (if such segments were determined in accordance with optional Step 4) stored in a separate file.

With the completion of Step 5, the reference signature of the machine to be tested has been obtained, windowed (optional), processed by a linear or non-linear transformation, segmented (optional), and stored for later use. During a subsequent inspection and testing of the machine, the procedures as described in Steps 6 through 11 determine the state of the machine.

Step 6—Sense and Monitor One or More Sets of Time Domain Vibrational Characteristics Of Machine Under Test Condition.

The sixth step in diagnosing a machine is to sense and monitor the vibrational characteristics under test condition, (i.e., not known to be operating normally). The vibrational data should be acquired under identical machine operations as the reference vibrational data was acquired in Step 1. It may be necessary, due to slight variations in machine vibration characteristics, to collect multiple sets of vibration data, followed by an averaging process, as described in Step 8, to obtain an average machine signature. In the decision-making process of a preferred embodiment, it is necessary to have multiple sets of data, as discussed infra.

Step 7—Process Time Domain Vibrational Data Obtained in Step 6 by a Linear or Non-linear Transformation to Create One or More Sets of Test Signatures. If Windows Were Selected Under Step 2, Process Time Domain Vibrational Data Using Same Window Configuration Selected in Step 2.

The seventh step in diagnosing a machine is to process the time-domain vibrational data obtained in Step 6 by a linear or non-linear transformation to create one or more sets of test signatures. The processing method is the same as that used in Step 3 to process the reference condition data, and also using the same time-domain windowing as was determined to be necessary for the reference condition data in Step 2. Alternatively, new time-domain windows could be computed using the same process as described in Step 2, and then applied to the test data to create the test signatures. After this processing is complete, the test signature is in a similar form as the reference signature.

Step 8—Compute One or More Average Sets of Reference and Test Signatures From Sets of Reference Signatures Previously Stored in Step 5 and Sets of Test Signatures Computed in Step 7 (Optional Step).

In a preferred embodiment, the multiple sets of reference and test signatures are averaged prior to use in the comparison step (Step 9). Referring once again to FIGS. 3A and 3B, FIGS. 3A and 3B represent acceleration signals of a defect-free machine, obtained at different times. It can be seen from FIGS. 3A and 3B that even the vibration signature of a defect-free machine can vary over time. The vibration signatures can also vary from operation to operation, as in sequential operations of a momentarily operating machine, such as a circuit breaker. The averaging procedure of the invention is utilized to smooth out these minor differences of signatures obtained under the same condition, (i.e., either both reference or both test condition).

In a preferred embodiment, four sets of reference signatures, $(R_1, R_2, R_3, R_4)$, are obtained. Five reference averages are computed according to the following formulae:

$RAVG_{overall}$=average of $(R_1, R_2, R_3, R_4)$
$RAVG_1$=average of $(R_1, R_2, R_3)$
$RAVG_2$=average of $(R_1, R_2, R_4)$
$RAVG_3$=average of $(R_1, R_3, R_4)$
$RAVG_4$=average of $(R_2, R_3, R_4)$ Four sets of test signatures, $(T_1, T_2, T_3, T_4)$, are then obtained. Four test averages are computed according to the following formulae:

$TAVG_1$=average of $(T_1, T_2, T_3)$
$TAVG_2$=average of $(T_1, T_2, T_4)$
$TAVG_3$=average of $(T_1, T_3, T_4)$
$TAVG_4$=average of $(T_2, T_3, T_4)$ It is to be noted that the average is an arithmetic average calculated between corresponding points of the reference and test signatures.

If the decision rendered in Step 11 indicates the machine is defect-free, the test signatures could then be utilized to update the reference signature averages. In a preferred embodiment, the first test signature averages $(TAVG_1, TAVG_2, TAVG_3, TAVG_4)$ obtained after the reference is created replace the original reference signature averages $(RAVG_1, RAVG_2, RAVG_3, RAVG_4)$. The overall reference average $(RAVG_{overall})$ is not affected by this process.

For example, vibrational data may be collected from a defect-free momentarily operating machine, such as a circuit breaker, during four consecutive operations. This set of four reference signatures may be averaged to form a first average reference. At a later time, this same defect-free machine is tested again during four consecutive operations, and this set of four signatures may be averaged to form a second average reference.

Step 9—Compare Test and Reference Signatures. If Averaging Was Performed in Step 8, Compare Test and Reference Signature Averages. If Segments Were Selected in Step 4. Process Comparison on Data Corresponding to the Selected Segments.

The ninth step of the method is to compare the test signature (or average test signature) with the previously stored reference signature (or average reference signature). The comparison is performed between similarly processed signatures, or in segments if segments were determined in Step 4, containing one or more points.

The comparison is performed by computing:

$$d_{A,B} = g\left(m, \sum_{n=1}^{m} f(\text{signature } A(\text{point } n), \text{signature } B(\text{point } n))\right)$$

where f( ) is any linear or non-linear function that computes a measure of the distance between signature A, point n, and signature B, point n, where point n refers to a value of the amplitude of the signature at a given point in time. Thus, the distance measurement is accomplished by measuring between corresponding points of different signatures. The summation is over the set of all points in the segment, 1 to m, (as determined in Step 4) being compared. The function g( ) is any linear or non-linear function applied to the number of points in the segment and the resulting sum.

In a preferred embodiment, the distance measurement uses the Euclidean distance which is defined as:

$$d_{A,B} = \sqrt{\sum_{n=1}^{m} (\text{signature } A(\text{point } n) - \text{signature } B(\text{point } n))^2}$$

where, $d_{A,B}$ is the Euclidean distance between corresponding points of signatures A and B. Corresponding points are those which occur at the same abscissa. Other distance measurement formulae, such as an absolute distance measure formula; formulae that use higher order powers and roots; or formulae that transform the data points using a linear or non-linear transformation, such as a log or power, either before or after the difference between the signature points is computed, are examples of the many variations of distance measurement techniques which are intended to be within the scope of the claimed invention.

In a preferred embodiment, a set of reference distances are computed from the individual or average reference signatures to the overall average reference signature. The elements of this set are identified as follows:

$D_R = \{d_{RAVG1,RAVGoverall}, d_{RAVG2,RAVGoverall}, d_{RAVG3,RAVGoverall}, d_{RAVG4,RAVGoverall}\}$ if average signatures are used, or, $D_R = \{d_{R1,RAVGoverall}, d_{R2,RAVGoverall}, d_{R3,RAVGoverall}, d_{R4,RAVGoverall}\}$ if individual signatures are used. Similarly, a set of test distances are computed from the individual or average test signatures to the overall average reference signature. The elements of this set are identified as follows:

$D_T = \{d_{TAVG1,RAVGoverall}, d_{TAVG2,RAVGoverall}, d_{TAVG3,RAVGoverall}, d_{TAVG4,RAVGoverall}\}$ if average signatures are used, or, $D_T = \{d_{T1,RAVGoverall}, d_{T2,RAVGoverall}, d_{T3,RAVGoverall}, d_{T4,RAVGoverall}\}$ if individual signatures are used.

Step 10—Render Decision Based Upon Comparison in Step 9 as to Mechanical Condition of Machine. (Normal, Abnormal, etc.).

The decision-making process compares the calculated test distance against an automatically computed threshold value and classifies the test distance as being normal or abnormal based on this comparison. In a preferred embodiment, the threshold is a function of the mean reference distance (MRD) and the reference and test standard deviations (RSD and TSD, respectively). The general form for the computation of the threshold is as follows:

Threshold = f(MRD, RSD, TSD)

where,
MRD = mean of elements in reference distance set $D_R$
RSD = standard deviation of elements in reference distance set $D_R$
MTD = mean of elements in test distance set $D_T$
TSD = standard deviation of elements in test distance set $D_T$ The specific method used to compute the threshold is as follows:

Threshold = Max[$T_1$, $T_2$]

where, $T_1 = MRD + (t_{b/2})(s_p)(1/m_1 + 1/m_2)^{\frac{1}{2}}$ $T_2 = MRD + (3)(RSD)$ and, $t_{b/2}$ is the value of the t-distribution obtained from a reference table, with $(m_1 + m_2 - 2)$ degrees of freedom, leaving an area of b/2 to the right, and $$s_p = \frac{(m_1 - 1)(RSD)^2 + (m_2 - 1)(TSD)^2}{m_1 + m_2 - 2}$$

and $m_1$ and $m_2$ are the number of operations used in determining the standard deviations for the reference and test signatures, respectively. Both $m_1$ and $m_2$ are equal to 4 in a preferred embodiment of the invention. The value of b/2 determines the probability of a false alarm. In a preferred embodiment, b/2 = 0.025 or 2.5%. For this value of b/2, and the values of $m_1$ and $m_2$ which give the degrees of freedom equal to 6, the value of $t_{b/2}$ is found to be 2.447 from a t-distribution table.

Conventionally, the threshold, T, is computed to be equal to $T_1$. Experimental tests, however, indicate that more reliable and consistent results are achieved by computing the threshold according to the formulae described above. The equation for $T_2$ provides a lower bound on the probability of false alarm. Satisfactory results have also been obtained using $T_2 = (2)(MRD)$.

Once the threshold is computed, the signature is classified as normal if the mean test distance (MTD) is less than or equal to the threshold and is abnormal if it is greater than the threshold. After classifying all the mean test distances in all the segments, if a minimum number of the tests indicate abnormality, the circuit breaker is classified as abnormal. In a preferred embodiment, this minimum number is one, so that if at least one mean test distance is greater than its corresponding threshold, machine abnormality would be declared.

For the time-domain vibration signals of FIGS. 3A–3D, the short-time power spectra in the 12–16 cycle time-domain window is calculated and shown in FIGS. 5A–5D respectively. As was noted previously, the two normal signatures in FIGS. 3A and 3B, as well as the two corresponding short-time power spectra shown in FIGS. 5A and 5B respectively, are visually different. Also, the abnormal signatures and spectra are virtually indistinguishable from the normal spectra. The results from the comparison and decision-making processes for the defective signatures of FIGS. 3C and 3D are shown in Tables A and B, respectively.

Figure 5A:
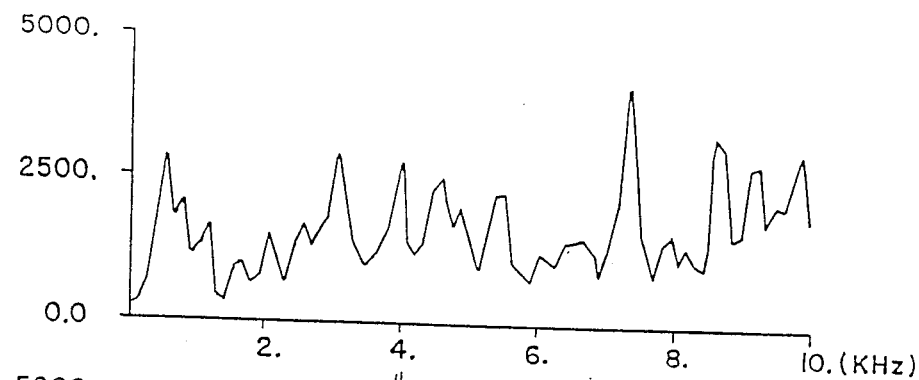
FIG. 5A ,shows the short-time power spectrum associated with a 12-16 cycle window of the signal shown in FIG. 3A.
Figure 5B:
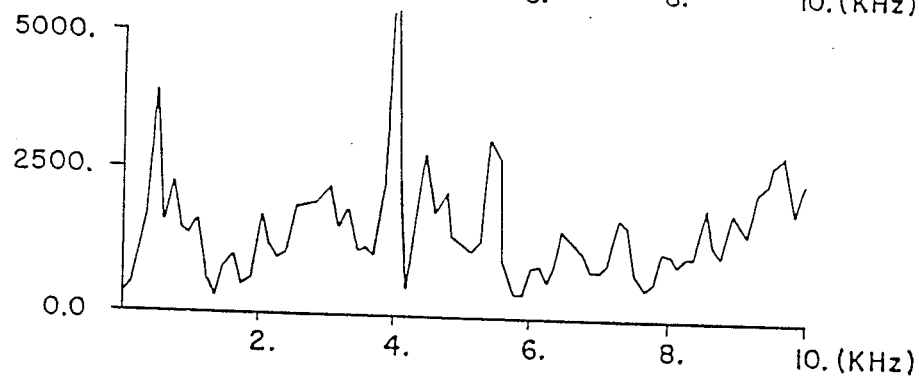
FIG. 5B shows the short-time power spectrum associated with a 12-16 cycle window of the signal shown in FIG. 3B.
Figure 5C:
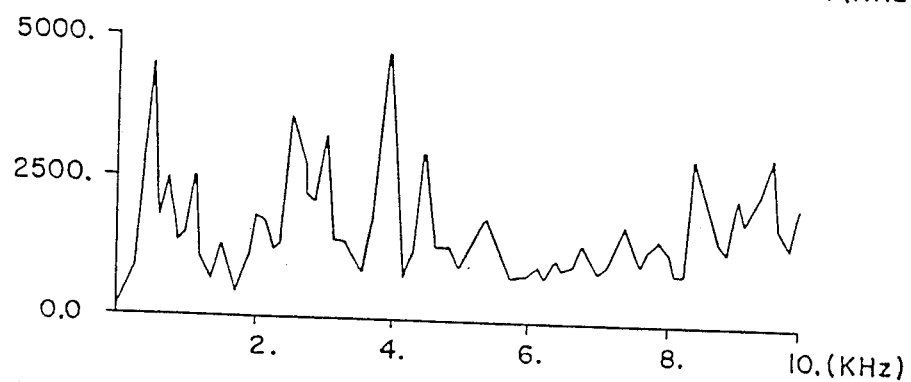
FIG. 5C shows the short-time power spectrum associated with a 12-16 cycle window of the signal shown in FIG. 3C.

Table A shows the results of the distance measurement and decision-making process using the short-time power spectra of FIGS. 5A and 5B as the reference signatures and the short-time power spectra of FIG. 5C as the test signature.

TABLE A

|  | Segments | | | |
| --- | --- | --- | --- | --- |
|  | 0–2 KHz | 2–5 KHz | 5–10 KHz | 0–10 KHz |
| Mean Reference Distance (MRD) | 1385.78 | 4527.67 | 5349.46 | 7182.26 |
| Reference Standard Deviation (RSD) | 280.66 | 1202.58 | 177.88 | 800.77 |
| Mean Test Distance (MTD) | 2297.65 | 4513.47 | 5218.78 | 7284.07 |
| Test Standard Deviation Deviation (TSD) | 363.35 | 956.63 | 111.68 | 636.80 |
| Threshold (T) | 2227.76 | 8135.41 | 5883.10 | 9584.57 |
| Resolution Ratio (RR) (RR) | 1.66 | 1.00 | 0.98 | 1.01 |
| Decision | Abnormal | Normal | Normal | Normal |
| Voter Decision | ABNORMAL | | | |

Figure 5D:
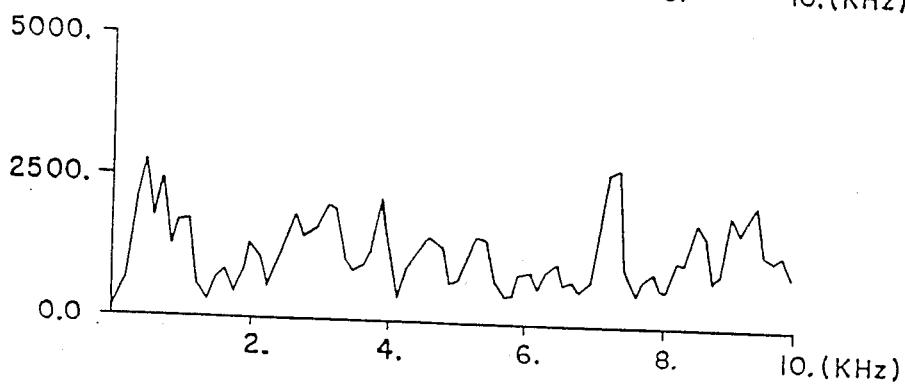
FIG. 5D shows the short-time power spectrum associated with a 12-16 cycle window of the signal shown in FIG. 3D.

Table B shows the results of the distance measurement and decision-making process using the short-time power spectra of FIGS. 5A and 5B as the reference signatures and the short-time power spectra of FIG. 5D as the test signature.

TABLE B

|  | Segments | | | |
| --- | --- | --- | --- | --- |
|  | 0–2 KHz | 2–5 KHz | 5–10 KHz | 0–10 KHz |
| Mean Reference Distance (MRD) | 1385.78 | 4527.67 | 5349.46 | 7182.26 |
| Reference Standard Deviation (RSD) | 280.66 | 1202.58 | 177.88 | 800.77 |
| Mean Test Distance (MTD) | 1092.69 | 3000.42 | 5167.97 | 6047.98 |
| Test Standard Deviation Deviation (TSD) | 257.98 | 522.19 | 492.06 | 682.33 |
| Threshold (T) | 2227.76 | 8135.41 | 5989.52 | 9584.57 |
| Resolution Ratio (RR) (RR) | 0.79 | 0.66 | 0.97 | 0.84 |
| Decision | Normal | Normal | Normal | Normal |
| Voter Decision | NORMAL | | | |

It is seen that the defects cannot be easily detected in the overall frequency ranges and the frequency-domain segmenting can not considerably increase the difference between the test distance and reference distance measures. The defects seem too subtle to be detected from the short-time power spectra associated with the four cycle window.

Reducing the time-domain window to a one cycle window located between 12–13 cycles produces the short-time power spectra shown in FIGS. 6A–6D for the signals of FIGS. 3A–3D, respectively. The normal power spectra, shown in FIGS. 3A and 3B, are now quite similar and both abnormal power spectra, shown in FIGS. 3C and 3D, are different from the normal power spectra. The results of the comparison and decision-making processes is given in Tables C and D for the defective signatures of FIGS. 3C and 3D, respectively.

Figure 6A:
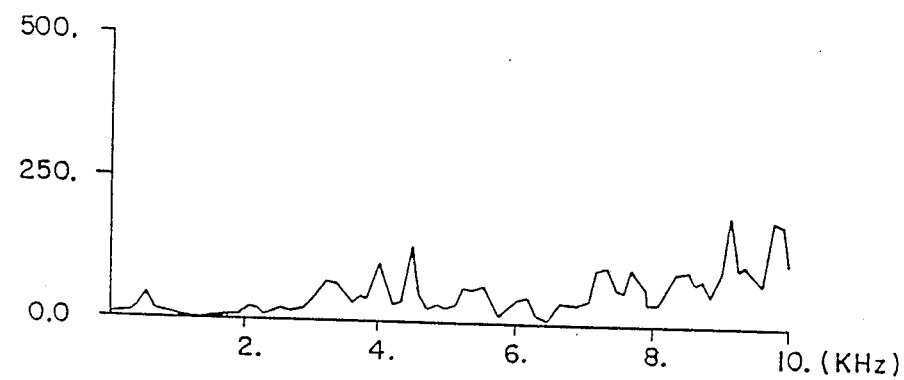
FIG. 6A shows the short-time power spectrum associated with a 12-13 cycle window of the signal shown in FIG. 3A.
Figure 6B:
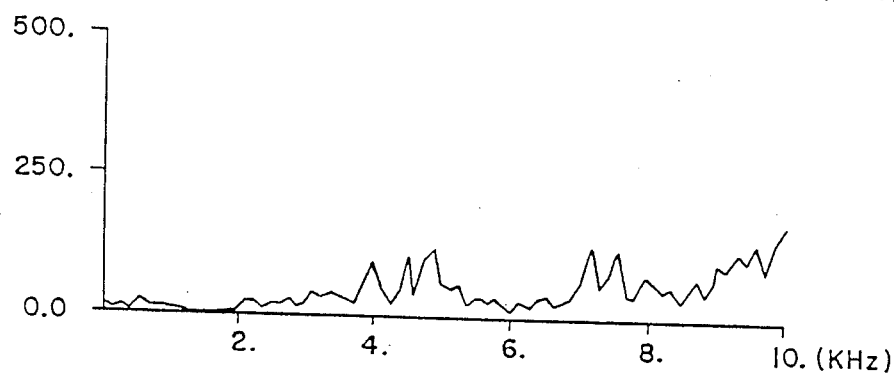
FIG. 6B shows the short-time power spectrum associated with a 12-13 cycle window of the signal shown in FIG. 3B.
Figure 6C:
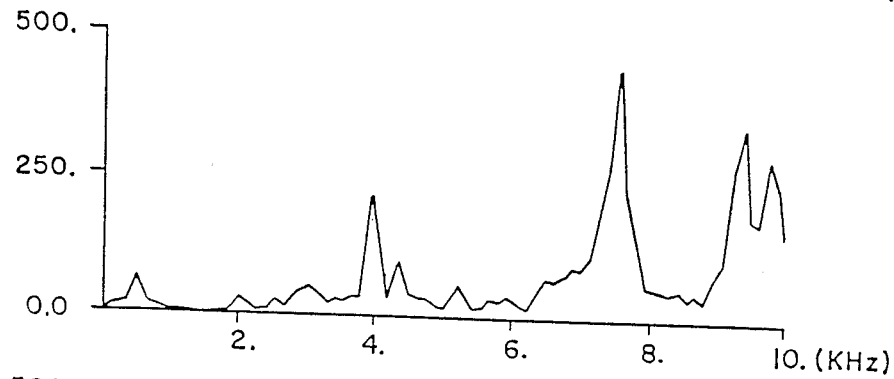
FIG. 6C shows the short-time power spectrum associated with a 12-13 cycle window of the signal shown in FIG. 3C.

Table C shows the results of the distance measurement and decision-making process using the short-time power spectra of FIGS. 6A and 6B as the reference signatures and the short-time power spectra of FIG. 6C as the test signature.

TABLE C

|  | Segments | | | |
| --- | --- | --- | --- | --- |
|  | 0–2 KHz | 2–5 KHz | 5–10 KHz | 0–10 KHz |
| Mean Reference Distance (MRD) | 45.07 | 169.66 | 289.43 | 337.90 |
| Reference Standard Deviation (RSD) | 4.52 | 20.46 | 31.39 | 34.22 |
| Mean Test Distance (MTD) | 11.06 | 235.40 | 671.58 | 711.60 |
| Test Standard Deviation Deviation (TSD) | 2.28 | 12.75 | 59.37 | 59.12 |
| Threshold (T) | 58.63 | 231.04 | 383.60 | 440.56 |
| Resolution Ratio (RR) (RR) | 0.25 | 1.39 | 2.32 | 2.11 |
| Decision | Normal | Abnormal | Abnormal | Abnormal |
| Voter Decision | ABNORMAL | | | |

Figure 6D:
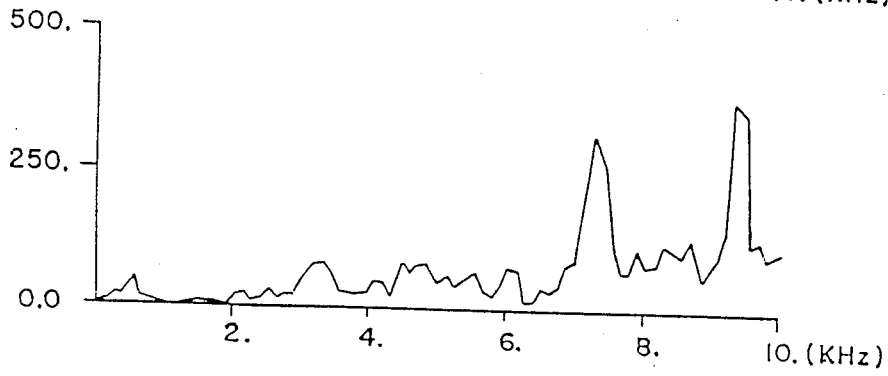
FIG. 6D shows the short-time power spectrum associated with a 12-13 cycle window of the signal shown in FIG. 3D.

Table D shows the results of the distance measurement and decision-making process using the short-time power spectra of FIGS. 6A and 6B as the reference signatures and the short-time power spectra of FIG. 6D as the test signature.

TABLE D

|  | Segments | | | |
| --- | --- | --- | --- | --- |
|  | 0–2 KHz | 2–5 KHz | 5–10 KHz | 0–10 KHz |
| Mean Reference Distance (MRD) | 45.07 | 169.66 | 289.43 | 337.90 |
| Reference Standard Deviation (RSD) | 4.52 | 20.46 | 31.39 | 34.22 |
| Mean Test Distance (MTD) | 22.59 | 163.16 | 582.43 | 605.55 |
| Test Standard Deviation (TSD) | 1.53 | 19.97 | 35.53 | 29.26 |
| Threshold (T) | 58.63 | 231.04 | 383.0 | 440.56 |
| Resolution Ratio (RR) (RR) | 0.50 | 0.96 | 2.01 | 1.79 |
| Decision | Normal | Normal | Abnormal | Abnormal |
| Voter Decision | ABNORMAL | | | |

It is noted that the decision associated with the overall frequency ranges can correctly detect the defects and that the difference between the test distance and reference distance measures increases in a segment of the spectra (5–10 KHz). This indicates that the defective mechanism causes some changes in high frequency components.

Referring to Tables A–D above, a measure of the effectiveness of the decision obtained is the ratio of the Mean Test Distance (MTD) to the Mean Reference Distance (MRD), which is designated as the Resolution Ratio (RR). Under normal machine operating conditions, the expected value of the resolution ratio is approximately 1. Under abnormal machine conditions, the resolution ratio should be typically greater than 1. As the resolution ratio increases, so too do the observable differences between the signatures.

Another use of the resolution ratio is to determine if the testing procedure is effective since under most circumstances, this ratio should not be much less than 1. If it is, it may imply that the reference signature(s) may be improper and that the diagnosis of a particular machine cannot be achieved with that signature. For example, Table B shows that a defect could not be detected and the resolution ratios were much less than 1. Refining the test procedure to use a 1 cycle window produces the resolution ratios of greater than 1 as shown in Table D. Thus, one should be confident that the decisions summarized in Table D are valid.

Step 11—Indicate Decision (Condition of Machine).

The results of the decision-making process may be indicated in any number of ways. For example, the decision may be used to sound an alarm, or the condition of the machine can be displayed on a CRT, etc.

Database Driven Diagnostic System

The implementation of the diagnostic procedures of the invention in a portable instrument requires the identification and development of a substantial support environment. The environment provided by the system must, (1) be user friendly, (2) fully automate all of the processing, (3) possess artificial intelligence capabilities to minimize operator interaction, and, (4) be a flexible and useful system.

The following is a description of a preferred embodiment of the database driven diagnostic system of the invention. This description is illustrative of a preferred embodiment only, and is not intended to restrict or limit the scope of the claimed invention. For example, reference is made to a specific machine, (e.g., circuit breaker), and a particular non-linear transformation, (e.g., power spectrum). The claimed invention is not limited to this particular machine or non-linear transformation.

The present invention provides a flexible method to fully automate the sequencing of the method steps of the invention. The traditional prior art method of using a single custom program with the various processing steps directly coded into the program fails to meet the flexibility needs. This need arises from the fact that each machine type will need similar but different processing steps. The differences are in size, location, and number of time-domain windows and/or frequency-domain segments as well as in the specific types of processing to be used in each region.

This special need for flexibility is satisfied by the database driven support system of the invention. All the processing steps are implemented as independent modules. A control program is used to sequence the processing through steps specified by the information in the database. The control program also controls the data flow using uniquely named files between the processing steps that are linked together.

The support system is organized into 6 independent processing modules. The control module, CBD, sequences the processing, by invoking the processing modules, as specified by the information in the database. The control module also automatically sequences the data flow between the processing modules. The control module also invokes the data acquisition module.

The data acquisition module, ACQUIRE, controls the hardware elements of the invention and senses the vibrational characteristics of the machine. It monitors the functions of the hardware elements and detects signal problems by observing the overload detection circuit to detect out of range signals, and also monitors the accelerometers to detect signal continuity in the accelerometers and cables. If a fault is detected, it can be indicated to the operator. For an out of range signal, the data acquisition software automatically reduces the programmable gain setting of the hardware and asks for the data to be re-taken. For a faulty accelerometer or cable, ACQUIRE can wait for the problem to be corrected by the operator prior to acquisition of the vibrational characteristics of the machine.

The window power spectrum module, WPS, is responsible for computing the power spectrum of the vibrational data within a specific time-domain window. The module reads the input data from a specified vibrational data file, computes the power spectra of the specified time-domain window, and outputs a data file that contains the power spectra.

The averaging module, AVG, obtains the average of the specifed plurality of power spectra data files and writes the result to an output data file.

The distance measurement module, DIST, uses the test signature data files, (or average test signature data files), and the reference signature data files, (or average reference signature data files), and creates an output file that contains the distance measurements. This module may also use the segmentation control to segment the signatures.

The decision-making module, VOTER, determines the threshold and analyzes the test distances to determine and indicate the state of the machine, (normal or abnormal). This module uses the test and reference distance files created by the distance measurement module to evaluate the condition of the machine and render a decision.

The event detection module, EVDET, is used to perform the event extraction process as discussed previously. This module uses the vibrational data files and determines the event locations so that windows may be placed to encompass the events. This module writes the window specification database that is utilized by the control module, CBD, for sequencing the processing.

The database for the diagnostic system is represented by a set of files. The diagnostic system gets all the information it needs to run effectively from these files. The most important of these files are the ones that contain the execution control language since they specify the sequencing of the processing steps and also specify the data flow between the modules implementing the processing steps. The definition of this language is closely related with formulation of command lines for each program module representing a specific processing step. A unique file naming convention also functions to facilitate the proper storage of incoming data and to facilitate the flow of data from one processing step to the next. Other files which are part of the database indicate the time-domain windows to be used for the signal processing, control the settings of the data acquisition system, and maintain a history of testing activity and results of a particular machine. Using an implementation based upon databases, it is very easy for the programs, such as the event location program, to modify the data and affect the remaining functions and/or later processing performed by the control module via the individual processing modules. Thus the diagnostic system can configure itself (i.e., artificial intelligence) for a particular machine to be tested.

The database driven diagnostic system of the invention is described in more detail herebelow:

File names

Each program module typically has to operate on one or more input files and generate an output file. Therefore the command line for a module will typically specify the type of processing, the options to control the processing, one or more input file names and an output file name.

There are basically two types of files handled by the system: one that contains the raw data and another that contains processed information such as the power spectrum. Raw data files are created by the data acquisition module. Each of these files contain a channel of time-domain information. The factors considered in selecting a naming convention for these files are as follows:
1. Each file has a particular channel of data.
2. Each file corresponds to a particular operation number.
3. The files were created on a particular day.
4. They belong to a specific test set conducted on that particular day.

These considerations are incorporated by requiring that a root name of a file be specified and that the remaining characters being automatically generated. The root name is used to link the data file from one processing step to the next and finally to the decision-making step. The most commonly used root names are "tst" to represent test data, "spn" to represent files containing the normal power spectrum, "spt" to represent files containing test power spectrum and "ref" to represent filed containing reference power spectrum. The automatically generated characters will represent the year, month, day and test set number on the day of processing, the operation number and the channel being processed. Each is represented by a single character. The format for a raw data file name is as follows:

XXXXTYMD.RC
XXXX—root name
T—test set number on that particular day
Y—year
M—month
D—day
R—operation number
C—channel number The naming convention for a file that contains the power spectrum is similar to that specified above with one addition. The window number is also included in the file extension. This is because a power spectrum is usually obtained for specific time-domain window of the raw data.

Execution Control Language

As mentioned previously, the command line for a module typically specifies the type of processing, the options to control the processing, one or more input file names and an output file name. Also, the same type of processing may be applied to different channels, stored in different files and also for different windows stored in the same file. An execution control language specifies these processing steps.

Language definition

The format of the execution control database language is as follows:
operation number(s): channel number(s): window number(s) program-name window-specification command-line-arguments input-file-specification output-file-specification.

The operation number is recursively defined as follows:

| | | |
|---|---|---|
| operation number | → | a digit followed by num |
| | → | a digit followed by a "-" followed by operation number |
| | → | empty set |
| num | → | a digit followed by num |
| | → | empty set |

A circuit breaker open operation is identified by an odd number and a close operation identified by an even number. Therefore, when a range is specified as beginning with an even number and ending with an even number, only even number operations will be processed by that step. Thus 2-6 represents operations 2,4,6. A similar processing is used for the odd ranges.

The data channel number and window number is specified in a similar manner except that the above special distinctions are not needed for indicating ranges of channels and windows. The specification for the channel number is shown below:

| channel number | → | a digit followed by num |
|---|---|---|
| | → | a digit followed by a "-" followed by channel number |
| | → | a digit followed by a "," followed by channel number |
| | → | empty set |

The window specification is identical to that of the channel specification.

The program-name and command-line-arguments are used simply to specify the type of processing and the options to control the processing. Interpretations of these fields are not required by the control program.

The window-specification is optional. The presence of a %W indicates that the window specification(s) for the associated command line(s) are obtained from a window specification file to be described later.

The input and output-file-specifications follow the same conventions. These fields provide for both substitution of the appropriate input file names and automatically generate unique file names for each operation and channel number as necessary.

The specifications are as follows:
   %D represents the raw data file name
   %I represents an input file name
   %O represents an output file name
   %R represents an input file name list for all operations that line is to be executed on.

These specifications are generally prefixed with appropriate characters to generate the full command line. For example, "i%Ifilename" will generate the filename prefixed with "-i" i.e., "-ifilename". Note the command "-i" is a command to the program being run, and is not part of the language specification. This is further explained with examples in the next section. The filename can be specified in one of the following ways:

1. XXXX - where XXXX represents the root name of the file. This kind of specification is expanded with the year, month, date and test number along with the appropriate extension. This is typically used to specify raw data and power spectrum file names. Note that the power spectrum file names have an additional character of extension that specifies the number of the window over which the power spectrum was obtained.

2. XXXX. - In this case the "." implies that the information pertaining to the date and test number are not added and only an extension is added in order to complete the file name. Again, the type of extension depends on whether the file is a raw data or a power spectrum file. This type of specification is typically used to represent the name of the file that contains the averaged power spectrum of a normal operation. Since this averaged power spectrum is to be used in computing the distances in a test operation, which could be done on another day, the information pertaining to the date must be omitted in order to maintain consistency.

3. XXXX.ext - In this case the full file name is specified and there is no expansion. This is typically used to specify the name of the file that contains the results of the distance measurements, i.e., the mean and standard deviation values.

4. XXXX..ext - This is also typically used to specify the name of the file that contains the results of the distance measurements, except that the presence of ".." indicates that the information pertaining to the date and test number, namely "Y", "M", "D" and "T", be inserted. This gives an indication of the date on which the distance measurements were done.

Illustrative examples

1. A typical execution control database (ECD) line for WPS ( the windowed Power Spectrum program) is as follows:
   2:3:1:wps %W -i%Ddat -o%Ospn
This may be expanded as follows:
   wps -s8000 -n2048 -idat10C5.23 -ospn10C5.231
The window specification -s8000 -n2048 is assumed to have been obtained from a "window specification file". The file names have been automatically named for a particular date, operation number and window number.

2. A typical ECD line for DIST (the distance measurement program) is as follows:
   2-8:3:1:dist -s16-c6-r%Iref. -i%Rspn -o%Oref..dis
This will be expanded as follows:
   dist -s16 -c6 -rref.231 -ispn10C5.231 -ispn10C5.431 -ispn10C5.631 -ispn10C5.831 -oref0C5.dis Data Base File Specifications The main control program obtains information pertaining to a breaker from a set of files. These files contain information about the type of breaker, information about data acquisition and about the various processing to be performed on the breaker.

These files can be categorized as global files and local files. The global files contain information common to all breakers and the local files contain information unique to the breaker under consideration. Many of these files are in simple ASCII and can be manipulated by either other programs or directly by the operator via a text editor.

Local Files

Circuit breaker information file (.CBI extension)
This file is the root of all the information pertaining to a breaker. The names of various other files containing the information required by the control program are present in this file. The file specification is as follows:
   line 1: location of breaker
   line 2: name of manufacturer
   line 3: rating of breaker
   line 4: breaker model #
   line 5: breaker serial #
   line 6: raw data file rootname
   line 7: window specification file name
   line 8: sensor ID file name
   line 9: history file name
   line 10: data acquisition initialization file name
   line 11: number of operations
   line 12-17: ECD file names
   line 13 - end of file: Information pertaining to the location of sensors. This information is for display purposes.

Window specification file (.WIN extension)
This file contains information about the location of events in the raw data. This file is created either manually or by a program that determines the occurrence of events in the time domain. The format for this file is as follows:

channel number: -sstarting point -nnumber of points

For example, "1: -s8000 -n2048", represents a window of size 2048 points in channel 1 starting at the 8000th point.

As mentioned previously, if a %W is specified in an execution control data base line, then the window specification information is obtained from this file. The information is extracted by channel number, then by the window number. In this window specification file, window number, n, for a given channel corresponds to the nth line specifying a window for the particular channel number.

Execution control database files (.ECD extension)

These files contain the execution control sequences for the diagnostic system. These file consist of lines written in the execution control language. A typical ECD file is shown below:

2-8:1-4:1:avg -i%Rspn -o%Ornl
    2-2:1-4:1:copy %Irnl %Orefer.

Circuit breaker test history file (.HIS extension)

This file contains the history of the tests conducted on the breaker. This file is created when the diagnostic system is first run. For all subsequent runs, the relevant information is appended to the file. The format for this file is as follows:

line 1: date on which test was conducted
    line 2: type of maintenance
    line 3: number of operations
    line 4: number of channels
    line 5: sampling frequency
    line 6: number of pretrigger samples
    line 7: raw data file name
    line 8: test number The test number for a particular test may be obtained from this file. The date on which the file was last modified is obtained. If this corresponds to the current date, then the test number of the previous test is obtained from this file and is incremented by one to give the current test number. Otherwise, it is determined that the test is the first test of the day on the particular breaker and thus the test number is one. This process is used to obtain the test number for building the file names. Data acquisition control file (.DAQ extension)

This file contains necessary information to initialize and control the data acquisition hardware. The format of this file is as follows:

--- line 1: sampling frequency in KHz
line 2: number of channels
line 3: number of pretrigger samples
line 4: excitation current value
line 5: current enable mask
line 6: cut-off frequency:gain:ac/dc (for channel 1)
line 7: cut-off frequency:gain:ac/dc (for channel 2)
.
.
line 13: cut-off frequency:gain:ac/dc (for channel 8)
line 14: trigger select information for first operation
.
.

---

-continued line 17: trigger select information for fourth operation

---

The trigger select information is as follows:
    A/B/E/channel #(1-16) : TP : TT : Thresh : AMP If A is specified in the first field, then the external trigger is due to the signal voltage $V_A$. If B is specified, then the trigger is due to the signal voltage $V_B$. If a channel number is specified, then the trigger is internal and is obtained from the specified channel.

---

TP - Trigger polarity (pos/neg)
TT - Trigger type a - always
                 s - slope
                 l - level
                 t - threshold
Thresh - unscaled integer
AMP - completes the control word of the trigger attribute latch

--- if A specified then absolute mode else window mode
if M specified then missing pulse detector is enabled
if P is specified polarity is inverted Global Files Sensor calibration file (sensor.cal)
The format of the file is as follows:

--- sensor ID : gain factor
    sensor ID : gain factor
    .
    .

--- where sensor ID is a 1-n character alphanumeric ID of the sensor and gain factor is a floating point calibration factor to convert from counts in the A/D to g's.

In a preferred embodiment, the database driven diagnostic system of the invention is implemented by computer software. A listing of the source program (in C language and also in 8088 assembly language) is provided in microfiche appendix.

An index to the appendix appears herebelow:

Index to Microfiche Appendix

The microfiche appendix includes seven software modules, CBD, ACQUIRE, WPS, DIST and AVG, VOTER, and EVDET, arranged in 94 frames. The microfiche contains seven (7) rows and fourteen (14) vertical columns and should be read in a downward fashion beginning with the leftmost column (column 1), reading down the seven rows of column 1 and then reading down the rows of column 2, etc. Frame locations are designated "Frame Start" and "Frame End" which indicates the frame locations where an individual software module begins and ends, respectively. Locations are designated by a set of two integers (a, b) where a=column number and b=row number. For example, module CBD ends at frame (6,3) which means that this software listing ends in the frame located at column 6, row 3 of the microfiche. The modules, their associated files, and frame locations are as follows:

---

| MODULE NAME: | CBD |
|---|---|
| ASSOCIATED FILES | CBD1, DATE, FMENU1, FILOP, FOCHK, TSENS, |
| 'C' SOURCE: | SEARCH D, GET_FILE, LD_WS, GET_TSTN, DISPLAY |
| 'ASM' SOURCE: | POSCUR, MODE, GETCON, WRTATT, WRTCHR |

-continued

| | |
|---|---|
| HEADER FILES: | ACQ.H, CBD.H |
| FRAME START: | (1, 1) |
| FRAME END: | (6,3) |
| MODULE NAME: | ACQUIRE |
| ASSOCIATED FILES 'C' SOURCE: | ACQUIRED, ACQINIT2, ACQSORT5, GET_TSTN, DISPLAY, DATE, FOCHK, FILOP, ODD |
| 'ASM' SOURCE: | GETCON, POSCUR, MODE |
| HEADER FILES: | ACQ.H |
| FRAME START: | (6, 3) |
| FRAME END: | (9, 6) |
| MODULE NAME: | WPS |
| ASSOCIATED FILES 'C' SOURCE: | WPS, FFT1, INPUT1, OUTPUT1, REM_DC |
| 'ASM' SOURCE: | WRAPPER1 |
| FRAME START: | (9, 6) |
| FRAME END: | (10, 7) |
| MODULE NAMES: | DIST and AVG |
| ASSOCIATED FILES 'C' SOURCE: | DIST1, FOCHK, SQUARE, OUTPUT1, AVG, FOCHK |
| FRAME START: | (10, 7) |
| FRAME END: | (12, 1) |
| MODULE NAME: | VOTER |
| ASSOCIATED FILES 'C' SOURCE: | VOTER1, FOCHK, SQUARE |
| 'ASM' SOURCE: | POSCUR, MODE, GETCON |
| FRAME START: | (12, 1) |
| FRAME END: | (12, 6) |
| MODULE NAME: | EVDET |
| ASSOCIATED FILES 'C' SOURCE: | EVDET2, WINPUT, RECTFY, ENV, REM_DC |
| 'ASM' SOURCE: | WRAPPER1 |
| FRAME START: | (12, 6) |
| FRAME END: | (14, 3) |

Although a preferred embodiment of the invention has been shown and described, it will be apparent to those skilled in the art that various changes and modifications may be made therein without departing from the spirit of the invention or from the scope of the appended claims.

We claim:

1. Apparatus for diagnosing a mechanical condition of a machine, said apparatus comprising:
   means for sensing reference vibrational characteristics of said machine;
   means for creating a reference signature from said reference vibrational characteristics;
   means for saving said reference signature;
   means for sensing test vibrational characteristics of said machine;
   means for creating a test signature from said test vibrational characteristics;
   means for automatically computing a measured distance between at least one point on the reference signature and at least one corresponding point on the test signature;
   means for automatically comparing said measured distance against a threshold value to determine if said machine is operating normally or abnormally; and
   means for providing a signal when said comparison indicates abnormal operation.

2. Apparatus as recited in claim 1 wherein said apparatus is portable.

3. Apparatus as recited in claim 1 wherein said means for sensing said reference and test vibrational characteristics comprises an accelerometer.

4. Apparatus as recited in claim 1 wherein said means for sensing said reference and test vibrational characteristics comprises a microphone and said vibrational characteristics comprise acoustical energy.

5. Apparatus as recited in claim 1 wherein said means for sensing said reference and test vibrational characteristics are located remote from the machine element to be monitored.

6. Apparatus as recited in claim 1 wherein said means for sensing said reference and test vibrational characteristics comprises a plurality of sensing devices which function simultaneously to obtain vibration data during operation of the machine.

7. Apparatus as recited in claim 1 wherein said means for creating a reference signature further comprises means for automatic selection of windows within said reference vibrational characteristics.

8. Apparatus as recited in claim 7 wherein said means for automatic selection of windows comprises means for extracting an event from said reference vibrational characteristics and selecting said windows to encompass said event.

9. Apparatus as recited in claim 7 wherein said means for automatic selection of windows comprises:
   means for processing an envelope of vibrational characteristics;
   means for extracting peaks and valleys of said envelope; and
   means for extracting events from said reference vibrational characteristics using said extracted peaks and valleys.

10. Apparatus as recited in claim 9 wherein said means for processing an envelope of said reference vibrational characteristics comprises:
    means for rectifying the reference time-domain vibrational characteristics;
    means for determining localized maxima of said vibrational characteristics.

11. Apparatus as recited in claim 9 wherein said means for extracting peaks and valleys of said envelope comprises means for applying a curve-fitting technique to a set of points which define the envelope to determine the peaks and valleys within said envelope.

12. Apparatus as recited in claim 11 wherein said curve-fitting technique is a least-square error linear fit technique.

13. Apparatus as recited in claim 11 wherein said curve-fitting technique is a least-square error quadratic fit technique.

14. Apparatus as recited in claim 9 wherein said means for extracting events from said reference vibrational characteristics using said extracted peaks and valleys further comprises means for eliminating insignificant peaks and valleys.

15. Apparatus as recited in claim 1 wherein said means for creating a reference signature further comprises means for processing said time-domain vibrational data by a linear or non-linear transformation to create one or more sets of reference signatures.

16. Apparatus as recited in claim 15 wherein said processing means converts the time-domain vibrational data into a frequency-domain spectrum.

17. Apparatus as recited in claim 15 wherein said non-linear transformation is a short-time power spectral transformation.

18. Apparatus as recited in claim 15 wherein said linear transformation is a non-recursive transformation.

19. Apparatus as recited in claim 1 wherein said means for saving said reference signature includes means for isolating and saving a preselected segment of said reference signature.

20. Apparatus as recited in claim 17 wherein said means for saving said reference signature includes means for isolating and saving a preselected segment of said reference signature.

21. Apparatus as recited in claim 20 wherein said preselected segment is 0-10 KHz.

22. Apparatus as recited in claim 20 wherein said preselected segment constitutes a plurality of segments defined by 0-2 KHz, 2-5 KHz, 5-10 KHz, and 0-10 KHz.

23. Apparatus as recited in claim 1 wherein said means for creating said test signature from said test vibrational characteristics comprises means for processing said time-domain vibrational data by a linear or non-linear transformation identical to the transformation used to create the reference signature, wherein said processing means creates one or more sets of test signatures.

24. Apparatus as recited in claim 1 wherein said means for creating a test signature further comprises means for utilizing an identical window configuration as that used for said reference vibrational characteristics.

25. Apparatus as recited in claim 1, comprising means for averaging multiple sets of reference signatures, and for averaging multiple sets of test signatures.

26. Apparatus as recited in claim 1, wherein said computed distance is a Euclidean distance as:

$$d_{A,B} = \sqrt{\sum_{n=1}^{m} (\text{signature } A(\text{point } n) - \text{signature } B(\text{point } n))^2}$$

where, $d_{A,B}$ is the Euclidean distance between corresponding points of signatures A and B, where signature A is the test signature and signature B is the reference signature.

27. Apparatus as recited in claim 1 wherein said threshold is defined by:

Threshold = f(MRD, RSD, TSD)

where,
MRD = means of elements in reference distance set $D_R$
RSD = standard deviation of elements in reference distance set $D_R$
MTD = mean of elements in test distance set $D_T$
TSD = standard deviation of elements in test distance set $D_T$ the specific method used to compute the threshold is as follows:

Threshold = Max where,
$T_1 = \text{MRD} + (t_{b/2})(s_p)(1/m_1 + 1/m_2)^{\frac{1}{2}}$
$T_2 = \text{MRD} + (3)(\text{RSD})$ and, $t_{b/2}$ is the value of the t-distribution, with $(m_1 + m_2 - 2)$ degrees of freedom, leaving an area of b/2 to the right, (where $0 < b < 1$), and $$s_p = \frac{(m_1 - 1)(RSD)^2 + (m_2 - 1)(TSD)^2}{m_1 + m_2 - 2}$$

and $m_1$ and $m_2$ are the number of operations used in determining the standard deviations for the reference and test signatures, respectively.

28. Apparatus as recited in claim 1 and further comprising means for pre-processing said reference vibrational characteristics and means for pre-processing said test vibrational characteristics.

29. Apparatus as recited in claim 28 wherein said pre-processing means is an inverse-filter.

30. A method for diagnosing a mechanical condition of a machine, said apparatus comprising:
sensing reference vibrational characteristics of said machine in the time domain;
creating a reference signature from said reference vibrational characteristics;
saving said reference signature;
sensing test vibrational characteristics of said machine in the time domain;
creating a test signature from said test vibrational characteristics;
automatically computing a measured distance between at least one point on the reference signature and at least one corresponding point on the test signature;
automatically comparing said measured distance against a threshold value to determine if said machine is operating normally or abnormally; and
providing a signal when said comparison indicates abnormal operation.

31. A method as recited in claim 30 and further comprising determining the reliability of said normal or abnormal determination by calculating a resolution ratio.

* * * * *

UNITED STATES PATENT AND TRADEMARK OFFICE
CERTIFICATE OF CORRECTION

PATENT NO. : 4,980,844

DATED : December 25, 1990

INVENTOR(S) : Victor Demjanenko et al

It is certified that error appears in the above-identified patent and that said Letters Patent is hereby corrected as shown below:

Title page, the assignees should be listed as follows:
[73] Assignee: The Research Foundation of State Unsiversity of New York, State University Plaza, Albany, New York and Electric Power Research Institute, Palo Alto, California.

Column 32, Claim 27, line 7, "means" should read "mean" and line 10, "DR" should read "$D_R$".

Signed and Sealed this

Fourteenth Day of July, 1992

*Attest:*

DOUGLAS B. COMER

*Attesting Officer*     *Acting Commissioner of Patents and Trademarks*